US010252931B2

United States Patent
N'Gom et al.

(10) Patent No.: US 10,252,931 B2
(45) Date of Patent: Apr. 9, 2019

(54) LASER CUTTING OF THERMALLY TEMPERED SUBSTRATES

(71) Applicant: Corning Incorporated, Corning, NY (US)

(72) Inventors: Moussa N'Gom, Painted Post, NY (US); Garrett Andrew Piech, Corning, NY (US); James Joseph Watkins, Corning, NY (US); Kristopher Allen Wieland, Painted Post, NY (US); Chad Michael Wilcox, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 355 days.

(21) Appl. No.: 14/993,236

(22) Filed: Jan. 12, 2016

(65) Prior Publication Data

US 2016/0200621 A1 Jul. 14, 2016

Related U.S. Application Data

(60) Provisional application No. 62/102,257, filed on Jan. 12, 2015.

(51) Int. Cl.
   *B32B 3/10* (2006.01)
   *C03B 33/02* (2006.01)
   (Continued)

(52) U.S. Cl.
   CPC ...... *C03B 33/0222* (2013.01); *B23K 26/0622* (2015.10); *B23K 26/359* (2015.10);
   (Continued)

(58) Field of Classification Search
   None
   See application file for complete search history.

(56) References Cited

U.S. PATENT DOCUMENTS 1,790,397 A 1/1931 Woods et al.
2,682,134 A 6/1954 Stookey
(Continued)

FOREIGN PATENT DOCUMENTS

CN 2388062 Y 7/2000
CN 1283409 C 11/2006
(Continued)

OTHER PUBLICATIONS

Abakians, H. et al.; Evaporative Cutting of a Semitransparent Body With a Moving CW Laser; Journal of Heat Transfer; Nov. 1988; pp. 924-930; vol. 110; ASME.
(Continued)

*Primary Examiner* — Christopher M Polley
(74) *Attorney, Agent, or Firm* — Smit Kapadia; Svetlana Z. Short

(57) ABSTRACT

Systems and methods for laser-cutting thermally tempered substrates are disclosed. In one embodiment, a method of separating a thermally tempered substrate includes directing a laser beam focal line such that at least a portion of the laser beam focal line is within a bulk of the thermally tempered substrate. The focused pulsed laser beam is pulsed to form a sequence of pulse bursts comprising one or more sub-pulses. The laser beam focal line produces a damage track within the bulk of the tempered substrate along the laser beam focal line. Relative motion is provided between the focused pulsed laser beam and the tempered substrate such that the pulsed laser beam forms a sequence of damage tracks within the tempered substrate. Individual damage tracks of the sequence of damage tracks are separated by a lateral spacing, and one or more microcracks connect adjacent damage tracks of the sequence of damage tracks.

20 Claims, 22 Drawing Sheets

(51) Int. Cl.
*B23K 26/38* (2014.01)
*B23K 26/402* (2014.01)
*B23K 26/0622* (2014.01)
*B23K 26/359* (2014.01)
*B23K 26/53* (2014.01)
*B23K 103/00* (2006.01)

(52) U.S. Cl.
CPC ............ *B23K 26/38* (2013.01); *B23K 26/402* (2013.01); *B23K 26/53* (2015.10); *B23K 2103/54* (2018.08); *Y02P 40/57* (2015.11)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,400,350 A | 3/1995 | Galvanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,656,186 A | 8/1997 | Mourou et al. |
| 5,676,866 A | 10/1997 | in den Baumen et al. |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,016,324 A | 1/2000 | Rieger et al. |
| 6,033,583 A | 3/2000 | Musket et al. |
| 6,038,055 A | 3/2000 | Hänsch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2004/0221615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0028728 A1 | 2/2006 | Li |
| 2006/0109874 A1 | 5/2006 | Shiozaki et al. |
| 2006/0127679 A1 | 6/2006 | Gulati et al. |

(56) References Cited

U.S. PATENT DOCUMENTS

| | | |
|---|---|---|
| 2006/0227440 A1 | 10/2006 | Gluckstad |
| 2006/0266744 A1 | 11/2006 | Nomaru |
| 2006/0289410 A1 | 12/2006 | Morita et al. |
| 2007/0091977 A1 | 4/2007 | Sohn et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1 | 4/2008 | Sezerman et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Weigel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0279895 A1 | 9/2016 | Marjanovic et al. |

(56) References Cited

U.S. PATENT DOCUMENTS

| | | |
|---|---|---|
| 2016/0280580 A1 | 9/2016 | Bohme |
| 2016/0290791 A1 | 10/2016 | Buono et al. |
| 2017/0169847 A1 | 6/2017 | Tamaki |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102343631 A | 2/2012 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 103159401 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 9106243 A | 4/1997 |
| JP | 11197498 A | 7/1999 |
| JP | 11269683 A | 10/1999 |
| JP | 11330597 A | 11/1999 |
| JP | 11347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009172633 A | 8/2009 |
| JP | 2010017990 A | 1/2010 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2013203631 | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 2013121908 A | 6/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| JP | 2013245153 A | 12/2013 |
| KR | 2012015366 | 2/2002 |
| KR | 2009057161 | 6/2009 |
| KR | 1020621 | 3/2011 |
| KR | 2012015366 A | 2/2012 |
| KR | 1120471 B1 | 3/2012 |
| KR | 2012074508 | 7/2012 |
| KR | 2013031380 | 3/2013 |
| KR | 1269474 | 5/2013 |
| KR | 1269474 B1 | 5/2013 |
| KR | 2013111269 A | 10/2013 |
| KR | 2013124646 | 11/2013 |
| KR | 2013124646 A | 11/2013 |
| KR | 1344368 | 12/2013 |
| KR | 2014022980 | 2/2014 |
| KR | 2014022980 A | 2/2014 |
| KR | 2014022981 | 2/2014 |
| KR | 2014022981 A | 2/2014 |
| KR | 2014064220 | 5/2014 |
| TW | 201139025 A | 11/2011 |
| TW | 201226345 | 7/2012 |
| TW | 201226345 A | 7/2012 |
| TW | 201331136 A | 8/2013 |
| TW | 201339111 A | 10/2013 |
| WO | 1999029243 A1 | 7/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 | 9/2013 |
| WO | 2013138802 A1 | 9/2013 |
| WO | 2013150990 A1 | 10/2013 |
| WO | 2013153195 A1 | 10/2013 |
| WO | 2014010490 A1 | 1/2014 |
| WO | 2014028022 A1 | 2/2014 |

(56) References Cited

FOREIGN PATENT DOCUMENTS

| WO | 2014064492 A1 | 5/2014 |
|---|---|---|
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 2016100954 | 1/2016 |
| WO | 20160154284 A1 | 9/2016 |

OTHER PUBLICATIONS

Ahmed, F. et al.; Display glass cutting by femtosecond laser induced single shot periodic void array; Applied Physics A Material Science & Processing; Jun. 3, 2008; pp. 189-192; vol. 93; Springer-Verlag.

Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.

Bhuyan, M.K. et al.; Femtosecond non-diffracting Bessel beams and controlled nanoscale ablation; ResearchGate Conference Paper; Sep. 2011; pp. 1-4.

Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.

Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.

Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.

Case Design Guidelines for Apple Devices; Sep. 13, 2013; pp. 1-58; Apple Inc.

Chiao, R. Y. et al.; Self-Trapping of Optical Beams; Physical Review Letters; Oct. 12, 1964; pp. 479-482; vol. 13, No. 15.

Corning EAGEL AMLCD Glass Substrates Material Information; Apr. 2005; pp. MIE 201-1-MIE 201-3; Corning Incorporated.

Corning 1737 AMLCD Glass Substrates Material Information; Aug. 2002; pp. MIE 101-1-MIE 101-3; Corning Incorporated.

Couairon, A. et al.; Femtosecond filamentation in transparent media; ScienceDirect Physical Reports; Feb. 6, 2007; pp. 47-189; vol. 441; Elsevier B.V.

Courvoisier, F. et al.; Applications of femtosecond Bessel beams to laser ablation; Applied Physics A Materials Science & Processing; Sep. 6, 2012; pp. 29-34; vol. 112; Springer-Verlag.

Courvoisier, F. et al.; Surface nanoprocessing with nondiffracting femtosecond Bessel beams; Optics Letters; Oct. 15, 2009; pp. 3163-3165; vol. 34, No. 20; Optical Society of America.

Dong, M. et al.; On-axis irradiance distribution of axicons illuminated by spherical wave; ScienceDirect Optics & Laser Technology; Sep. 2007; pp. 1258-1261; vol. 39; Elsevier Ltd.

Duocastella, M. et al.; Bessel and annular beams for materials processing; Laser & Photonics Reviews; 2012; pp. 607-621; vol. 6, No. 5.

Durnin, J.; Exact solutions for nondiffracting beams. I. The scalar theory; J. Opt. Soc. Am. A; Apr. 1987; pp. 651-654; vol. 4, No. 4; Optical Society of America.

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.

Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.

Gori, F. et al.; Analytical derivation of the optimum triplicator; Optics Communications; Dec. 1, 1998; pp. 13-16; vol. 157; Elsevier B.V.

Honda, M. et al.; A Novel Polymer Film that Controls Light Transmission; Progress in Pacific Polymer Science 3; 1994; pp. 159-169; Springer-Verlag Berlin Heidelberg.

Hu, Z. et al.; 5-Axis Laser Culling Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Verlag.

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature Communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.

Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.

Serafetinides, A. et al.; Polymer Ablation by Ultra-Short Pulsed Lasers; Proceedings of SPIE; 2000; pp. 409-415.

Shah, L. et al.; Micromachining with a High Repetition Rate Femtosecond Fiber Laser; JLMN-Journal of Laser Micro/Nanoengineering; Nov. 2008; pp. 157-162; vol. 3, No. 3.

Shealy, D. et al.; Geometric optics-based design of laser beam shapers; Opt. Eng.; Nov. 2003; pp. 3123-3138; vol. 42, No. 11; Society of Photo-Optical Instrumentation Engineers.

Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.

Thiele, E.; Relation between Catalytic Activity and Size of Particle; Industrial and Engineering Chemistry; Jul. 1939; pp. 916-920; vol. 31, No. 7.

Toytman, I. et al.; Optical breakdown in transparent media with adjustable axial length and location; Optic Express; Nov. 22, 2010; pp. 24688-24698; vol. 18, No. 24; Optical Society of America.

(56) References Cited

OTHER PUBLICATIONS

Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.
Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Ra & RMS: Calculating Surface Roughness; Harrison Eelectropolishing; 2012.
Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
GT ASF Grown Sapphire Cover and Touch Screen Material; www.gtat.com; 2012; pp. 1-2; GTAT Corporation.
Xu, H. et al.; Optimization of 3D laser cutting head orientation based on minimum energy consumption; Int J Adv Manuf Technol; Jun. 28, 2014; pp. 1283-1291; vol. 74; Springer-Verlag London.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
Abramov et al., "Laser separation of chemically strengthened glass"; Physics Procedia 5 (2010) 285-290, Elsevier.; doi: 10.1016/j.phpro.2010.08.054.
Arimoto et al., "Imaging properties of axicon in a scanning optical system"; Applied Optics, Nov. 1, 1992, vol. 31, No. 31, pp. 6653-6657.
"TruMicro 5000" Product Manual, Trumpf Laser GmbH + Co. KG, pp. 1-4, Aug. 2011.
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.
Krüger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"PHAROS High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Mature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp 354-364.
"The technology of chemical glass strengthening—a review," S. Karlsson, B. Jonson, Glas Technol.: Eur. J. Glass Sci. Technol. A. Apr. 2012 51 (2), 41-54.
Kerr. "Filamentary tracks formed in transparent optical glass by laser beam self-focusing. II. Theoretical Analysis" Physical Review A. 4(3) 1971, pp. 1196-1218.
International Search Report of the International Searchign Autority; PCT/US2016/012814; dated Apr. 29, 2016.

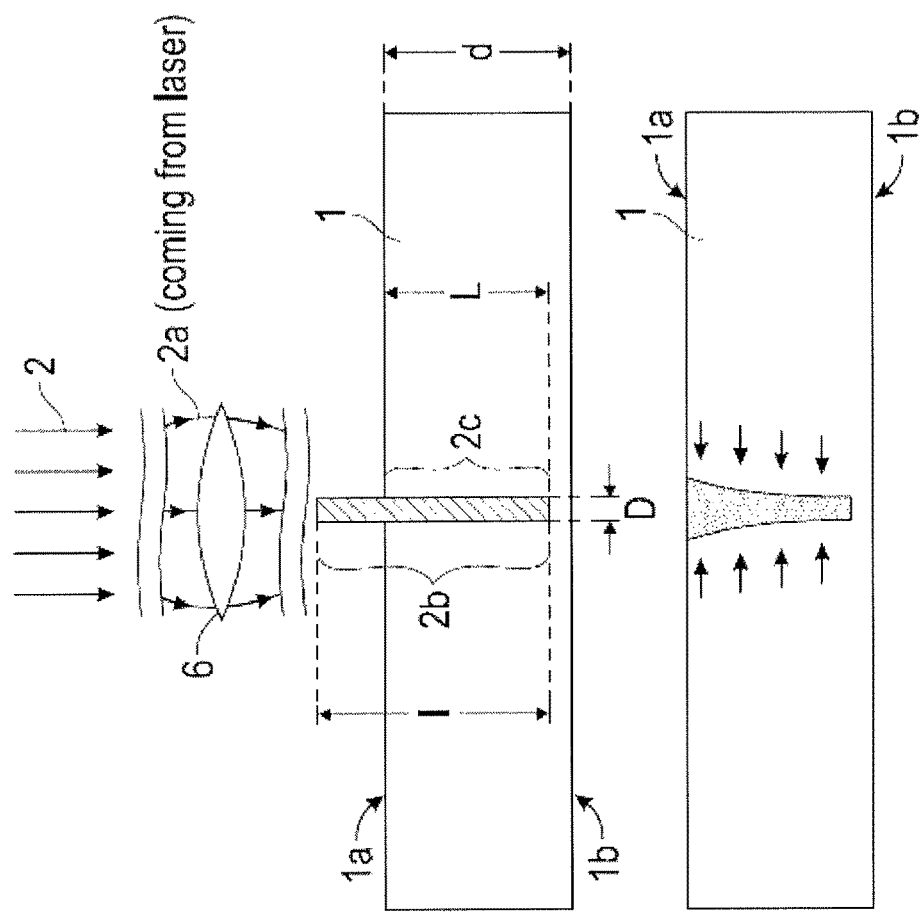

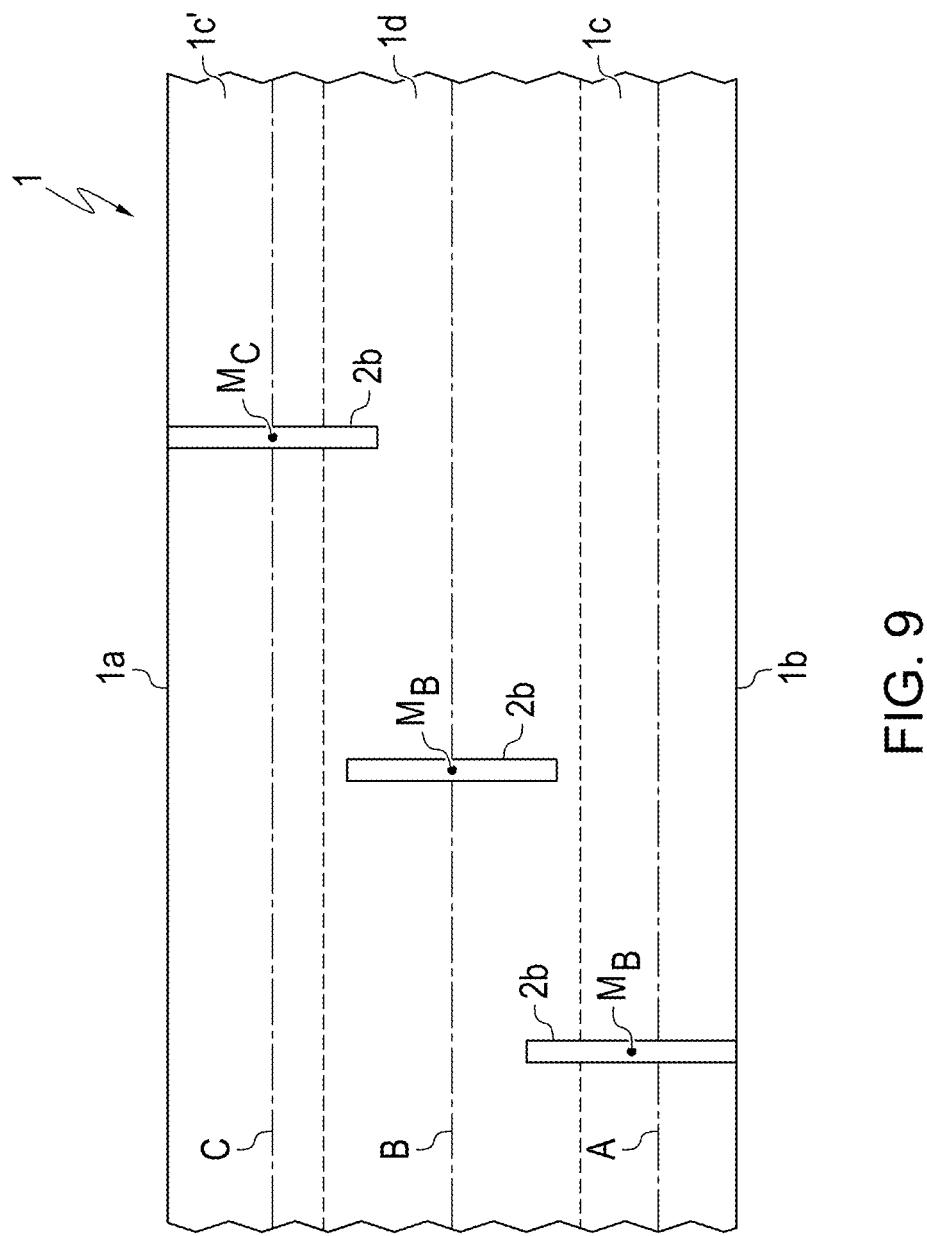

LASER CUTTING OF THERMALLY TEMPERED SUBSTRATES

This application claims the benefit of priority under 35 U.S.C. § 119 of U.S. Provisional Application Ser. No. 62/102,257 filed on Jan. 12, 2015, the content of which is relied upon and incorporated herein by reference in its entirety.

BACKGROUND

Thermally tempered substrates, such as thermally tempered glass, have a built-in stress profile that provides added strength and scratch resistance. Such substrates have found many applications, such as architectural glass applications and screens for electronic devices, for example.

In recent years, precision micromachining and its improvement of process development to meet customer demand to reduce the size, weight and material cost of leading-edge devices has led to fast pace growth in high-tech industries. Ultrafast industrial lasers are becoming important tools for applications requiring high precision micromachining.

However, due to the large amount of stress contained in thermally tempered glass, processing, such as cutting, is extremely difficult. Attempts at cutting thermally tempered glass with conventional methods releases this built-in stress and leads to fragmentation of the whole sheet. For this reason, thermally tempered glass is cut to shape before the thermal tempering process. Thus, thermally tempered glass sheets are only available in limited number of stock sizes. This may inhibit flexibility, impact the cost of custom fit sheets, and further limit use of tempered glass.

Accordingly, alternative systems and methods for cutting thermally tempered substrates may be desired.

SUMMARY

In one embodiment, a method of separating a thermally tempered substrate includes directing a laser beam focal line into the thermally tempered substrate such that at least a portion of the laser beam focal line is within a bulk of the thermally tempered substrate. The laser beam focal line is formed by a focused pulsed laser beam, and the laser beam focal line is disposed along a beam propagation direction. The method further includes pulsing the focused pulsed laser beam to form a first sequence of pulse bursts comprising one or more sub-pulses. The laser beam focal line generates an induced multi-photon absorption within the thermally tempered substrate that produces a damage track within the bulk of the thermally tempered substrate along the laser beam focal line. The method further includes providing relative motion between the focused pulsed laser beam and the thermally tempered substrate in a first laser beam pass such that the pulsed laser beam forms a first sequence of damage tracks within the thermally tempered substrate. Individual damage tracks of the first sequence of damage tracks are separated by a lateral spacing, and one or more microcracks connect adjacent damage tracks of the first sequence of damage tracks.

In another embodiment, a system for processing a thermally tempered substrate includes a laser source operable to emit a pulsed laser beam, a translation table operable to be translated along at least one axis and operable to receive the thermally tempered substrate; and an optical assembly disposed within an optical path of the pulsed laser beam. The optical assembly transforms the pulsed laser beam into a laser beam focal line, wherein at least a portion of the laser beam focal line is operable to be positioned within a bulk of the thermally tempered substrate such that the laser beam focal line generates an induced multi-photon absorption within the thermally tempered substrate to produce a material modification within the thermally tempered substrate along the laser beam focal line. The system further includes one or more controllers programmed to pulse the pulsed laser beam to form a sequence of pulse bursts comprising one or more sub-pulses, and to control the translation table to provide relative motion between the pulsed laser beam and the thermally tempered substrate along the at least one axis in a first laser beam pass such that the pulsed laser beam forms a sequence of damage tracks within the thermally tempered substrate. Individual damage tracks of the sequence of damage tracks are separated by a lateral spacing, and one or more microcracks extend between adjacent damage tracks of the sequence of damage tracks.

In yet another embodiment, a thermally tempered glass substrate includes a first surface and a second surface, wherein the first surface and the second surface have a compressive stress greater than or equal to 24 MPa, and a stress profile within a body of the thermally tempered glass substrate between the first and second surface is parabolic. The thermally tempered glass substrate further includes an edge extending from the first surface to the second surface, and a plurality of damage tracks positioned at the edge. Each individual damage track of the plurality of damage tracks has a diameter of less than or equal to 5 µm and has a length of greater than or equal to 250 µm. Adjacent damage tracks of the plurality of damage tracks are separated by a lateral spacing between about 2 µm and about 20 µm, and the plurality of damage tracks extend 50% or more of a length of the edge.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the representative embodiments.

FIGS. 1A and 1B are schematic illustrations of positioning the laser beam focal line in a thermally tempered substrate to form a damage track by induced absorption along the focal line according to one or more embodiments described and illustrated herein;

FIG. 3 is a schematic illustration of a second optical assembly for laser processing according to one or more embodiments described and illustrated herein;

FIG. 9 schematically depicts the laser line focus location within a thermally tempered substrate for three laser passes according to one or more embodiments described and illustrated herein;

DETAILED DESCRIPTION

Figure 2A:
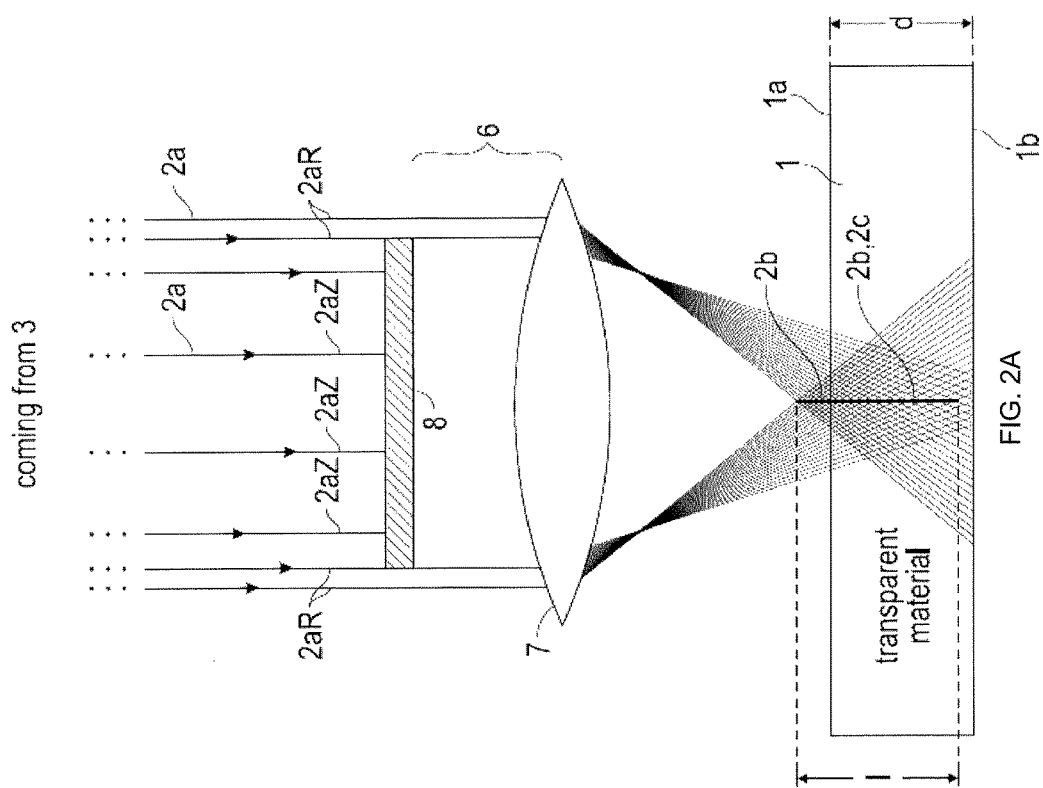
FIG. 2A is a schematic illustration of an optical assembly for laser processing according to one or more embodiments described and illustrated herein.

Embodiments described herein relate to methods and systems for optically cutting thermally tempered substrates, such as thermally tempered glass materials. Generally, a laser beam is transformed to a laser beam focus line that is positioned within the bulk of a thermally tempered substrate, such as thermally tempered glass, to create one or more damage lines formed by damage tracks within the material. The thermally tempered substrate is separated along these damage lines.

Generally, a series of damage tracks can be made at extremely fast rates, with translation speeds that can exceed 1 m/s. With highly stressed glass, as is the case for thermally tempered glass, microcracks (or a single microcrack) will form and propagate extremely quickly once a damage site is created. This creates a considerable challenge in cutting high central tension glass, as microcracks can form and propagate faster than many laser methods can create suitable damage sites to guide the crack front. This leads to a loss of control of the crack. However, the methods disclosed herein can form a complete damage track with a single laser pulse or burst pulse, and therefore easily create the damage track locations at a speed which exceeds the speed at which the microcracks propagate, ensuring that the microcracks are directed from damage track to damage track, rather than running "out ahead" of the laser damage.

Thermally tempered glass may be created by using a controlled thermal treatment to increase the strength of the glass. The glass is heated in a high temperature oven (~600° C.) and then its temperature rapidly lowered, for example by subjecting the glass to a cold air stream. This forces the outer layer of the glass to contract rapidly compared to the inner layers, which locks in high levels of compressive stress in the outer layers of the glass, while the inner layers of the glass are forced into tension to maintain a balance of forces inside the material. Fully tempered glass is generally defined as glass having a surface compressive stress of greater than 10,000 psi (69 MPa), and heat-strengthened glass is generally defined as glass having a surface compressive stress of greater than 3,500 psi (24 MPa).

The stress profile as a function of depth for thermal tempering is generally parabolic and slowly changing with depth, whereas with chemical strengthened glass (e.g., ion exchanged chemically strengthened glass) where the stress profile is more exponential with depth and confined to a region close to the glass surface. The compressive stress layer for thermally tempered glass is thus often much deeper, often >>100 μm for thermal tempering, but generally <100 μm for chemical strengthening. In addition, thermal tempering is generally limited to glass pieces of thickness >2 mm, and mostly >3 mm, whereas chemical strengthening is frequently confined to thinner glass pieces.

Such stress distribution and deep compressive stress layer makes the thermally tempered glass extremely resistant to breakage from surface impact. When the glass does break, it generally fractures into fragments which are not sharp.

At present, any cutting of thermally tempered glass involves special treatment of the glass first to effectively de-temper it. One method creates bands of un-tempered glass by heating the material locally around the desired shapes to be separated from a larger thermally tempered sheet. Then the glass is cut along the un-tempered bands so that the actual tempered portion of the sheet is surrounded by un-tempered (annealed) glass which is then finished Thermally tempered glass is in great demand where glass strength is desired. It is used in most modern architectural glass facades, in passenger vehicle windows, in shower doors, and a wide variety of consumer applications. In addition, thermally tempered soda-lime glass can be used in conjunction with higher quality display glasses such as alkaline boro-aluminosilicate glass (e.g., Corning® Eagle XG™ glass) to fabricate electrochromically controlled windows. The use of the higher quality display glasses (flatter, more compositional uniformity, low alkali content) for some of the portions of the window glass may stack lead to better electrical performance and higher yields when electrochromic electronic layers are applied. The ability cut both materials into complex shapes is of significant interest because it enables higher material (sheet) utilization. Electrochromic layers are applied and patterned on the glass, but must be applied after any thermal tempering, due to the high temperatures involved in tempering. If the thermally tempered glass can be cut after it is patterned with electrochromic layers, then greater process flexibility can be realized by using common equipment for coating and tempering, and then simply cutting the parts to shape downstream.

As stated above, embodiments of the present disclosure are directed to systems and methods for laser cutting thermally tempered glass without the need for de-tempering. Embodiments utilize an ultra-short pulsed laser and a specialized optical delivery system to create precise perforations (i.e., damage tracks) within the thermally tempered glass. These perforations or damage tracks allow any crack propagation to be precisely controlled, preventing the glass sheet from shattering during the cutting process.

In accordance with methods described below, a laser can be used to create highly controlled full line perforation through a thermally tempered (i.e., strengthened) material, with extremely little (<75 μm, often <50 μm) subsurface damage and negligible debris generation. Thus, it is possible to create a microscopic (i.e., <0.5 μm and >100 nm in diameter) elongated "hole" or void (also referred to as a perforation, defect line, or damage track herein) in transparent, thermally tempered material using a single high energy pulse or burst pulse. These individual damage tracks (or "perforations") can be created at rates of several hundred kilohertz (several hundred thousand perforations per second, for example). Thus, with relative motion between the source and the material these perforations can be placed adjacent to one another (spatial separation varying from sub-micron to tens of microns as desired). This spatial separation is selected in order to facilitate cutting. In some embodiments, the damage track is a "through hole", which is a hole or an open channel that extends from the top to the bottom of the transparent material. In some embodiments, the damage track may not be a continuous channel, and may be blocked or partially blocked by portions or sections of solid material (e.g., glass). As defined herein, the internal diameter of the damage track is the internal diameter of the open channel or the air hole or void in the material. For example, in the embodiments described herein the internal diameter of the damage track is <500 nm, for example ≤400 nm, or ≤300 nm.

As described in more detail below, the damage tracks formed by each laser pulse (or burst of sub-pulses) extend through the compressive layer(s) in into a tension region of the thermally tempered substrate. Unlike other laser methods, this method does not require a long dwell multiple-pulse or percussion drilling approach to drill a hole all the way through the material.

Because thermally tempered glass contains a high level of internal stress, microcracks will emerge from these damaged locations. However, they will preferentially be guided from one damage track to another, as long as the damage track sites are closely spaced and are formed faster than the speed of microcrack propagation. The propagation of these microcracks will then separate the glass along the desired perforated contour, as described in detail below.

The wavelength of the laser is selected so that the material to be laser processed (drilled, cut, ablated, damaged or otherwise appreciably modified by the laser) is transparent to the laser wavelength. In one embodiment, the material to be processed by the laser is transparent to the laser wavelength if it absorbs less than 10% of the intensity of the laser wavelength per mm of thickness of the material. In another embodiment, the material to be processed by the laser is transparent to the laser wavelength if it absorbs less than 5% of the intensity of the laser wavelength per mm of thickness of the material. In still another, the material to be processed by the laser is transparent to the laser wavelength if it absorbs less than 2% of the intensity of the laser wavelength per mm of thickness of the material. In yet another embodiment, the material to be processed by the laser is transparent to the laser wavelength if it absorbs less than 1% of the intensity of the laser wavelength per mm of thickness of the material.

The selection of the laser source is further predicated on the ability to induce multi-photon absorption (MPA) in the transparent material. MPA is the simultaneous absorption of multiple photons (e.g. two, three, four or more) of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two or more photons. MPA is a nonlinear process that is several orders of magnitude weaker than linear absorption. In the case of two-photon absorption, it differs from linear absorption in that the strength of absorption depends on the square of the light intensity, thus making it a nonlinear optical process. At ordinary light intensities, MPA is negligible. If the light intensity (energy density) is extremely high, such as in the region of focus of a laser source (particularly a pulsed laser source), MPA becomes appreciable and leads to measurable effects in the material within the region where the energy density of the light source is sufficiently high. Within the focal region, the energy density may be sufficiently high to result in ionization, breaking of molecular bonds, and vaporization of material.

At the atomic level, the ionization of individual atoms has discrete energy requirements. Several elements commonly used in glass (e.g., Si, Na, K) have relatively low ionization energies (~5 eV). Without the phenomenon of MPA, a wavelength of about 248 nm would be required to create linear ionization at ~5 eV. With MPA, ionization or excitation between states separated in energy by ~5 eV can be accomplished with wavelengths longer than 248 nm. For example, photons with a wavelength of 532 nm have an energy of ~2.33 eV, so two photons with wavelength 532 nm can induce a transition between states separated in energy by ~4.66 eV in two-photon absorption (TPA), for example.

Thus, atoms and bonds can be selectively excited or ionized in the regions of a material where the energy density of the laser beam is sufficiently high to induce nonlinear TPA of a laser wavelength having half the required excitation energy, for example. MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (i.e., a perforation, defect line, or damage track) that mechanically weakens the material and renders it more susceptible to cracking or fracturing. By controlling the placement of damage tracks, a contour or path along which cracking occurs can be precisely defined to guide stress-induced microcracks between adjacent damage tracks. The contour defined by a series of damage tracks may be regarded as a fault line and corresponds to a region of structural weakness in the material.

Damage tracks can be accomplished with a single "burst" of high energy, short duration sub-pulses spaced close together in time. The laser pulse duration may be $10^{-10}$ s or less, or $10^{-11}$ s or less, or $10^{-12}$ s or less, or $10^{-13}$ s or less. These "bursts" may be repeated at high repetition rates (e.g. kHz or MHz). The damage tracks may be spaced apart and precisely positioned by controlling the velocity of a substrate or stack of substrates relative to the laser through control of the motion of the laser and/or the substrate. As an example, in a thermally tempered substrate moving at 200 mm/sec exposed to a 100 kHz series of pulses, the individual pulses would be spaced 2 microns apart to create a series of damage tracks separated by 2 microns. In some embodiments, the thermally tempered substrate is positioned on a translation table (not shown) capable of being translated along at least one axis. Any translation table or other device capable of translating either the glass substrate or the optical delivery head may be utilized.

Turning to FIGS. 1A and 1B, a method of laser drilling a thermally tempered substrate includes focusing a pulsed laser beam 2 into a laser beam focal line 2b, viewed along the beam propagation direction. Laser beam focal line 2b is a region of high energy density. As shown in FIG. 2, laser 3 (not shown) emits laser beam 2, which has a portion 2a incident to optical assembly 6. The optical assembly 6 turns the incident laser beam into an extensive laser beam focal line 2b on the output side over a defined expansion range along the beam direction (length l of the focal line).

Embodiments of the present disclosure utilize non-diffracting beams ("NDB") to form the laser beam focal line 2b. Typically, laser processing has used Gaussian laser beams. The tight focus of a laser beam with a Gaussian intensity profile has a Rayleigh range ZR given by:

$$Z_R = \frac{\pi n_0 w_0^2}{\lambda_0}. \quad \text{Eq. (1)}$$

The Rayleigh range represents the distance over which the spot size $w_0$ of the beam will increase by $\sqrt{2}$ in a material of refractive index $\eta_0$ at wavelength $\eta_0$. This limitation is imposed by diffraction. Note in Eq. (1) that the Rayleigh range is related directly to the spot size, thereby leading to the conclusion that a beam with a tight focus (i.e. small spot size) cannot have a long Rayleigh range. Such a beam will maintain this small spot size only for a very short distance. This also means that if such a beam is used to drill through a material by changing the depth of the focal region, the rapid expansion of the spot on either side of the focus will require a large region free of optical distortion that might limit the focus properties of the beam. Such a short Rayleigh range also requires multiple pulses to cut through a thick sample.

However, embodiments of the present disclosure utilize NDBs instead of the optical Gaussian beams discussed above. Non-diffracting beams may propagate for a considerable distance before diffraction effects inevitably limit the beam focus. Although an infinite NDB does not suffer from diffractive effects, a physically realizable NDB will have a limited physical extent. The central lobe of the beam can be quite small in radius and thus produce a high intensity beam. There are several types of NDBs including, but not limited to, Bessel beams, Airy beams, Weber beams and Mathieu beams whose field profiles are typically given by special functions which decay more slowly in the transverse direction than a Gaussian function.

It should be understood that, although NDBs described are described herein in the context of Bessel beams, embodiments are not limited thereto. The central spot size of a Bessel beam is given by:

$$d = 2\frac{2.405\lambda_0}{NA \ 2\pi n_0}, \quad \text{Eq. (2)}$$

where NA is the numerical aperture given by the cone of plane waves making an angle of β with the optical axis. A key difference between Bessel beams and Gaussian beams is that Rayleigh range of a Bessel beam is given by:

$$Z_{max} = \frac{\pi D d}{4\lambda}, \quad \text{Eq. (3)}$$

where D is the finite extent of the beam imposed by some aperture or optical element. It is therefore shown that the aperture size D may be used to increase the Rayleigh range beyond the limit imposed by the size of the central spot. A practical method for generating Bessel beams is to pass a Gaussian beam through an axicon or an optical element with a radially linear phase gradient.

In general, the optical method of forming the line focus (i.e., the laser beam focal line) can take multiple forms, such as, without limitation, using donut shaped laser beams and spherical lenses, axicon lenses, diffractive elements, or other methods to form the linear region of high intensity. Various optical methods of forming and adjusting the line focus are described in U.S. Pat. Appl. No. 62/024,122, which is incorporated by reference herein in its entirety. The type of laser (picosecond, femtosecond, and the like) and wavelength (IR, visible, UV, and the like) may also be varied, as long as sufficient optical intensities are reached to create breakdown of the substrate material.

The laser power and lens focal length (which determines the line focus length and hence power density) are parameters that ensure full penetration of the substrate for cutting. Accordingly, the dimensions of the line focus formed in the substrate should be controlled.

Referring once again to FIGS. 1A and 1B, a thermally tempered substrate 1 (e.g., thermally tempered glass) in which internal modifications by laser processing and multiphoton absorption is to occur is schematically illustrated. The thermally tempered substrate 1 may be disposed on a substrate or carrier. In some embodiments, multiple thermally tempered substrates 1 are arranged in a stack for simultaneous processing. The thermally tempered substrate 1 may be positioned on a translation table (not shown) configured to move along at least one axis. The translation table may be controlled by one or more controllers (not shown), for example. The thermally tempered substrate 1 is positioned in the beam path to at least partially overlap the laser beam focal line 2b of laser beam 2. The laser beam 2 may be generated by a laser source (not shown), which may be controlled by one or more controllers (not shown), for example. Reference 1a designates the surface of the thermally tempered substrate 1 facing (closest or proximate to) the optical assembly 6 or the laser, respectively, and reference 1b designates the reverse surface of thermally tempered substrate 1 (the surface remote, or further away from, optical assembly 6 or the laser). The thickness of the thermally tempered substrate 1 (measured perpendicularly to the planes 1a and 1b, i.e., to the substrate plane) is labeled with d.

As FIG. 1A depicts, thermally tempered substrate 1 is aligned perpendicular to the longitudinal beam axis and thus behind the same focal line 2b produced by the optical assembly 6 (the substrate is perpendicular to the plane of the drawing). Viewed along the beam direction, the thermally tempered substrate 1 is positioned relative to the focal line 2b in such a way that the focal line 2b (viewed in the direction of the beam) starts before the surface 1a of the thermally tempered substrate 1 and stops before the surface 1b of the thermally tempered substrate 1, i.e. focal line 2b terminates within the thermally tempered substrate 1 and does not extend beyond surface 1b. In the overlapping area of the laser beam focal line 2b with thermally tempered substrate 1, i.e. in the portion of thermally tempered substrate 1 overlapped by focal line 2b, the extensive laser beam focal line 2b generates nonlinear absorption in thermally tempered substrate 1. (Assuming suitable laser intensity along the laser beam focal line 2b, which intensity is ensured by adequate focusing of laser beam 2 on a section of length l (i.e. a line focus of length l), which defines an extensive section 2c (aligned along the longitudinal beam direction) along which an induced nonlinear absorption is generated in the thermally tempered substrate 1.) The induced nonlinear absorption results in formation of a damage track or crack in thermally tempered substrate 1 along section 2c. The damage track or crack formation is not only local, but rather may extend over the entire length of the extensive section 2c of the induced absorption. The length of section 2c (which corresponds to the length of the overlapping of laser beam focal line 2b with thermally tempered substrate 1) is labeled with reference L. The average diameter or extent of the section of the induced absorption 2c (or the sections in the material of thermally tempered substrate 1 undergoing the defect line or crack formation) is labeled with reference D. This average extent D may correspond to the average diameter 6 of the laser beam focal line 2b, that is, an average spot diameter in a range of between about 0.1 µm and about 5 µm.

As FIG. 1A shows, the thermally tempered substrate 1 (which is transparent to the wavelength λ of laser beam 2) is locally heated due to the induced absorption along the focal line 2b. The induced absorption arises from the non-linear effects associated with the high intensity (energy density) of the laser beam within focal line 2b. FIG. 1B illustrates that the heated thermally tempered substrate 1 will eventually expand so that a corresponding induced tension leads to micro-crack formation, with the tension being the highest at surface 1a.

Representative optical assemblies 6, which can be applied to generate the focal line 2b, as well as a representative optical setup, in which these optical assemblies can be applied, are described below. All assemblies or setups are based on the description above so that identical references are used for identical components or features or those which are equal in their function. Therefore only the differences are described below.

To insure high quality (regarding breaking strength, geometric precision, roughness and avoidance of re-machining requirements) of the surface of separation after cracking along the contour defined by the series of damage tracks, the individual focal lines used to form the damage tracks that define the contour of cracking should be generated using the optical assembly described below (hereinafter, the optical assembly is alternatively also referred to as laser optics). The roughness of the separated surface is determined primarily by the spot size or the spot diameter of the focal line. A roughness of a surface can be characterized, for example, by an Ra surface roughness statistic (roughness arithmetic average of absolute values of the heights of the sampled surface). In order to achieve a small spot size of, for example, 0.5 µm to 2 µm in case of a given wavelength λ of laser 3 (interaction with the material of thermally tempered substrate 1), certain requirements must usually be imposed on the numerical aperture of laser assembly 6.

The laser cutting processes described herein generally generate a surface roughness of the exposed cut surface (edge) of a glass part of about 0.1-1.0 µm Ra, where Ra is the statistical roughness arithmetic average of absolute values of the heights of the sampled surface, which include the heights of bumps resulting from the spot diameter of the focal line. More commonly, the Ra value for the cut edge is about 0.25-0.75 µm for the laser processes described herein.

In order to achieve the required numerical aperture, the optics should, on the one hand, dispose of the required opening for a given focal length, according to the known Abbë formulae (N.A.=n sin (theta), n: refractive index of the material to be processed, theta: half the aperture angle; and theta=arctan (D/2f); D: aperture, f: focal length). On the other hand, the laser beam should illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only varies slightly.

FIG. 2A depicts one example method of generating a line focus. As stated above, there are many alternative methods of generating the line focus described herein, and embodiments are not limited to the example depicted in FIG. 2A. According to FIG. 2A (section perpendicular to the substrate plane at the level of the central beam in the laser beam bundle of laser radiation 2; here, too, laser beam 2 is perpendicularly incident to the thermally tempered substrate 1, i.e. incidence angle is 0° so that the focal line 2b or the extensive section of the induced absorption 2c is parallel to the substrate normal), the laser radiation 2a emitted by laser 3 is first directed onto a circular aperture 8 which is completely opaque to the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely blocked by it. Only the beams in the outer perimeter range of beam bundle 2a (marginal rays, here labeled with 2aR) are not blocked due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (defined by the distance required for the intensity of the beam to decrease to 1/e^2 of the peak intensity) and approximately 75% of the diameter of the lens of the optical assembly 6. The focal line 2b of a non-aberration-corrected spherical lens 7 generated by blocking out the beam bundles in the center is thus used. FIG. 2A shows the section in one plane through the central beam, the complete three-dimensional bundle can be seen when the depicted beams are rotated around the focal line 2b.

One potential disadvantage of this type of focal line is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means in turn that possibly only a part of the incident laser light is absorbed by the material to be processed in the desired way. In this way, the efficiency of the process (required average laser power for the desired separation speed) may be impaired, and the laser light may also be transmitted into undesired regions (parts or layers adherent to the substrate or the substrate holding fixture) and interact with them in an undesirable way (e.g. heating, diffusion, absorption, unwanted modification).

Figures 1, 2B:
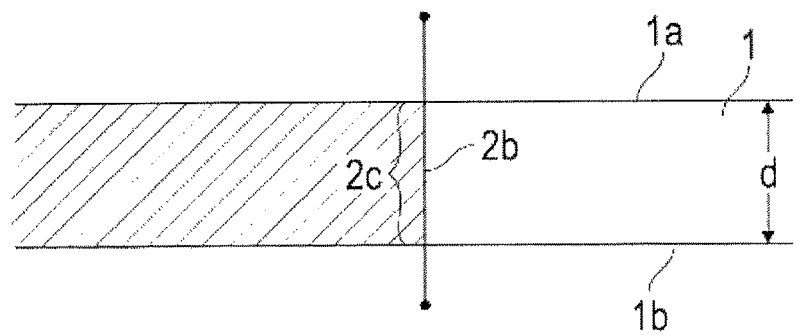
FIG. 2B-1 through 2B-4 are schematic illustrations of various possibilities to process the substrate by forming the laser beam focal line at different positions within the transparent material relative to the substrate according to one or more embodiments described and illustrated herein.
Figures 2, 2B:
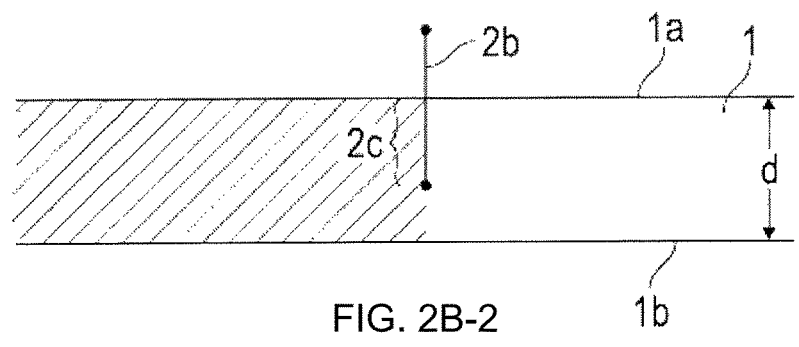
Figures 2, 2B, 3:
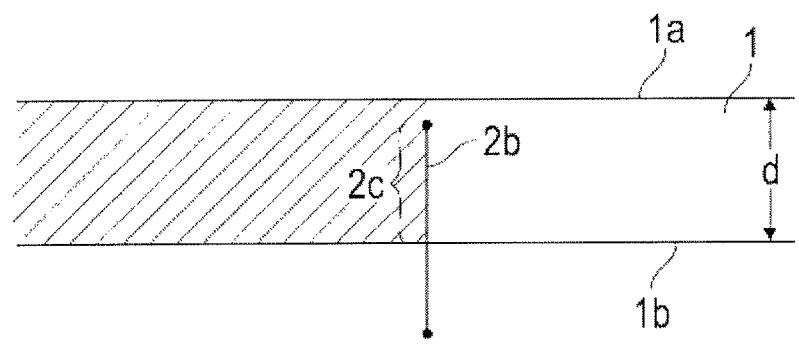
Figures 2, 2B, 3, 4:
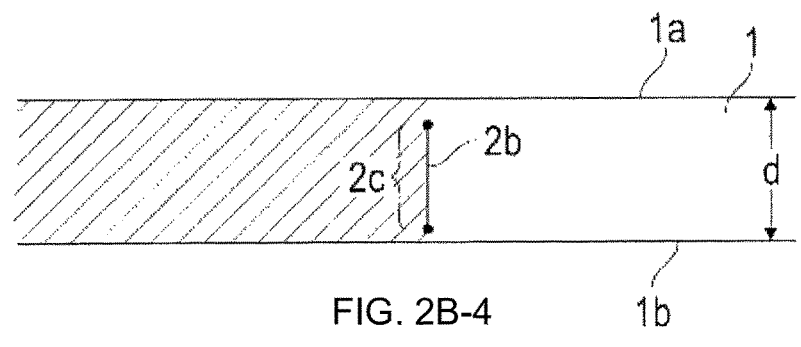
Figure 3:
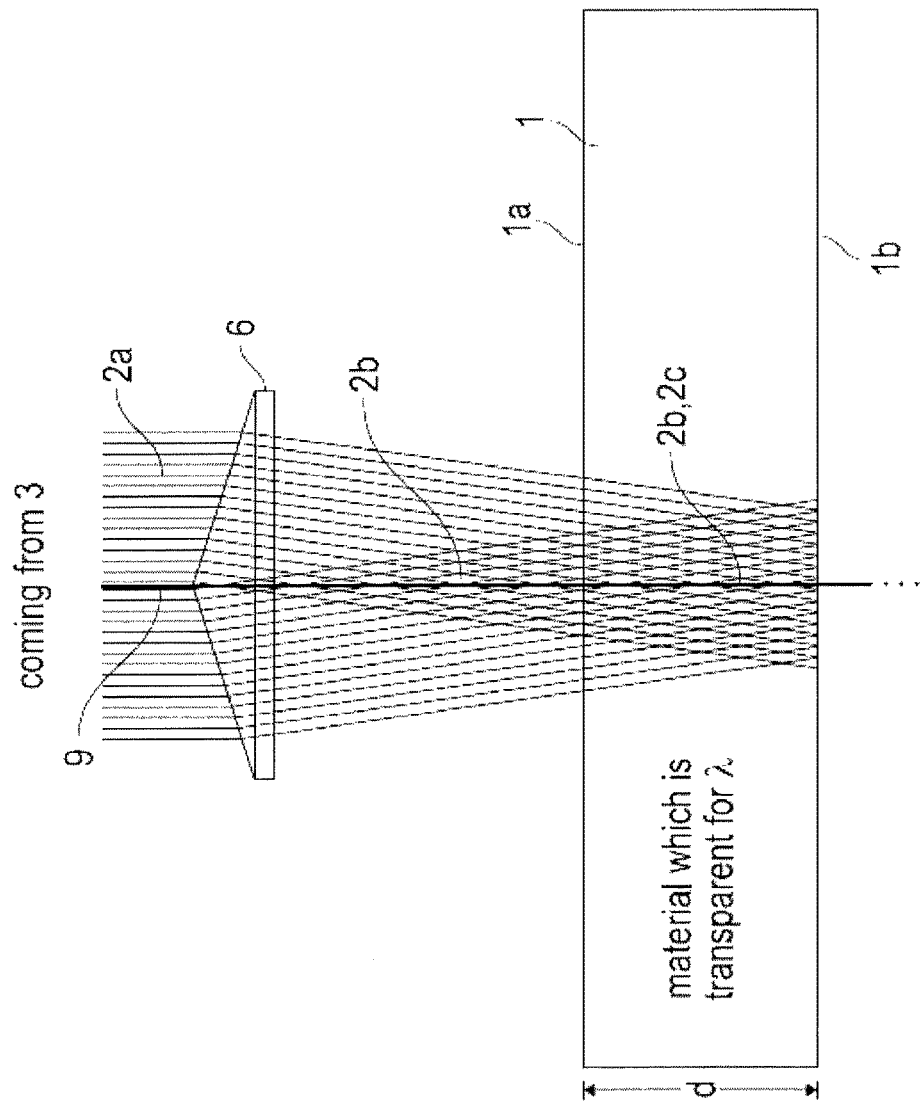

FIG. 2B-1-4 show (not only for the optical assembly in FIG. 2A, but also for any other applicable optical assembly 6) that the position of laser beam focal line 2b can be controlled by suitably positioning and/or aligning the optical assembly 6 relative to thermally tempered substrate 1 as well as by suitably selecting the parameters of the optical assembly 6. As FIG. 2B-1 illustrates, the length l of the focal line 2b can be adjusted in such a way that it exceeds the layer thickness d (here by factor 2). If thermally tempered substrate 1 is placed (viewed in longitudinal beam direction) centrally to focal line 2b, an extensive section of induced absorption 2c is generated over the entire substrate thickness.

In the case shown in FIG. 2B-2, a focal line 2b of length l is generated which corresponds more or less to the substrate thickness d. Since thermally tempered substrate 1 is positioned relative to line 2b in such a way that line 2b starts at a point outside the material to be processed, the length L of the section of extensive induced absorption 2c (which extends here from the substrate surface to a defined substrate depth, but not to the reverse surface 1b) is smaller than the length l of focal line 2b. FIG. 2B-3 shows the case in which the thermally tempered substrate 1 (viewed along the beam direction) is positioned above the starting point of focal line 2b so that, as in FIG. 2B-2, the length l of line 2b is greater than the length L of the section of induced absorption 2c in thermally tempered substrate 1. The focal line thus starts within the thermally tempered substrate 1 and extends beyond the reverse surface 1b. FIG. 2B-4 shows the case in which the focal line length l is smaller than the substrate thickness d so that—in the case of a central positioning of the substrate relative to the focal line viewed in the direction of incidence—the focal line starts near the surface 1a within the thermally tempered substrate 1 and ends near the surface 1b within the thermally tempered substrate 1 (e.g. l=0.75·d). The laser beam focal line 2b can have a length l in a range of between about 0.1 mm and about 100 mm or in a range of between about 0.1 mm and about 10 mm, for example. Various embodiments can be configured to have length l of about 0.1 mm, 0.2 mm, 0.3 mm, 0.4 mm, 0.5 mm, 0.7 mm, 1 mm, 2 mm, 3 mm or 5 mm, for example.

It is particularly advantageous to position the focal line 2b in such a way that at least one of surfaces 1a, 1b is covered by the focal line, so that the section of induced nonlinear absorption 2c starts at least on one surface of the material to be processed. In this way, it is possible to achieve virtually ideal cuts while avoiding ablation, feathering and particulate generation at the surface.

FIG. 3 depicts another applicable optical assembly 6. The basic construction follows the one described in FIG. 2A so that only the differences are described below. The depicted optical assembly is based the use of optics with a non-spherical free surface in order to generate the focal line 2b, which is shaped in such a way that a focal line of defined length l is formed. For this purpose, aspheres can be used as optic elements of the optical assembly 6. In FIG. 3, for example, a so-called conical prism, also often referred to as axicon, is used. An axicon is a conically cut lens which forms a spot source on a line along the optical axis (or transforms a laser beam into a ring). The layout of such an axicon is principally known to those of skill in the art; the cone angle in the example is 10°. The apex of the axicon labeled here with reference 9 is directed towards the incidence direction and centered on the beam center. Since the focal line 2b produced by the axicon 9 starts within its interior, thermally tempered substrate 1 (here aligned perpendicularly to the main beam axis) can be positioned in the beam path directly behind axicon 9. As FIG. 3 shows, it is also possible to shift thermally tempered substrate 1 along the beam direction due to the optical characteristics of the axicon while remaining within the range of focal line 2b. The section of extensive induced absorption 2c in the material of thermally tempered substrate 1 therefore extends over the entire depth d.

However, the depicted layout is subject to the following restrictions. Since the region of focal line 2b formed by axicon 9 begins within the axicon 9, a significant part of the laser energy is not focused into the section of induced absorption 2c of focal line 2b, which is located within the material, in the situation where there is a separation between axicon 9 and the material to be processed. Furthermore, length l of focal line 2b is related to the beam diameter through the refractive indices and cone angles of axicon 9. This is why, in the case of relatively thin materials (several millimeters), the total focal line is much longer than the thickness of the material to be processed, having the effect that much of the laser energy is not focused into the material.

Figure 4A:
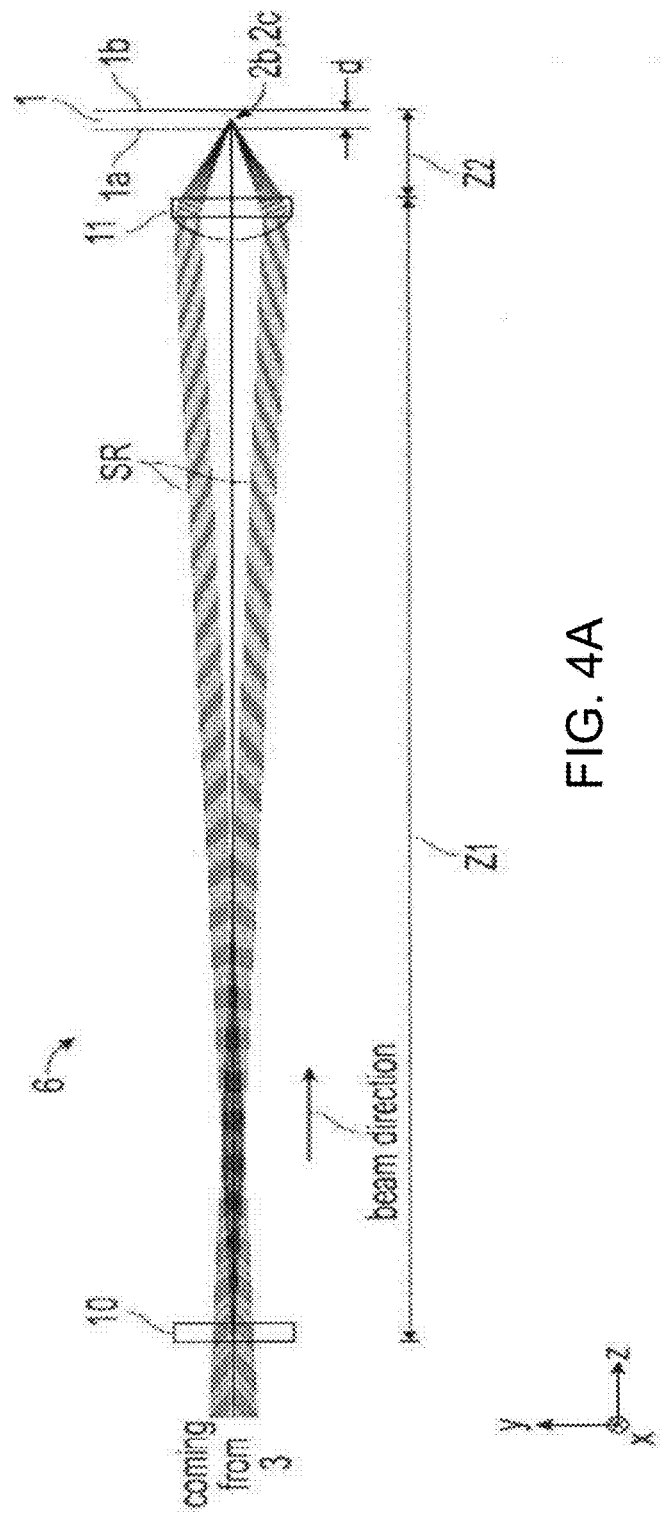
FIGS. 4A and 4B are schematic illustrations of a third optical assembly for laser processing according to one or more embodiments described and illustrated herein.

For this reason, it may be desirable to use an optical assembly 6 that includes both an axicon and a focusing lens. FIG. 4A depicts such an optical assembly 6 in which a first optical element (viewed along the beam direction) with a non-spherical free surface designed to form an extensive laser beam focal line 2b is positioned in the beam path of laser 3. In the case shown in FIG. 4A, this first optical element is an axicon 10 with a cone angle of 5°, which is positioned perpendicularly to the beam direction and centered on laser beam. The apex of the axicon is oriented towards the beam direction. A second, focusing optical element, here the plano-convex lens 11 (the curvature of which is oriented towards the axicon), is positioned in the beam direction at a distance z1 from the axicon 10. The distance z1, in this case approximately 300 mm, is selected in such a way that the laser radiation formed by axicon 10 is circularly incident on the outer radial portion of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

Figure 4B:
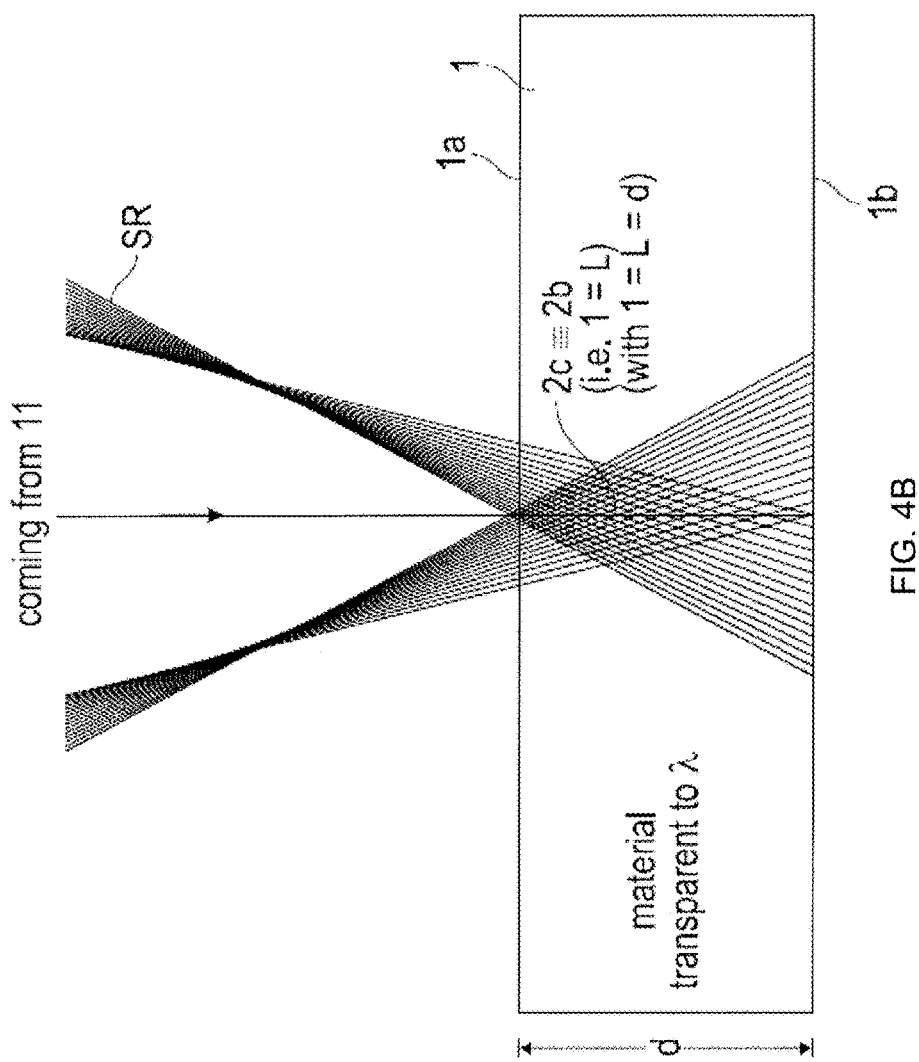

FIG. 4B depicts the formation of the focal line 2b or the induced absorption 2c in the material of thermally tempered substrate 1 according to FIG. 4A in detail. The optical characteristics of both elements 10, 11 as well as the positioning of them is selected in such a way that the length l of the focal line 2b in beam direction is exactly identical with the thickness d of thermally tempered substrate 1. Consequently, an exact positioning of thermally tempered substrate 1 along the beam direction should be provided to position the focal line 2b exactly between the two surfaces 1a and 1b of thermally tempered substrate 1, as shown in FIG. 4B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and, on the other hand, however, the circle of diffusion diminishes in intensity after the focal line 2b over a very short distance in the center of the spot, as a basically circular spot is formed. In this way, the crack formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length l of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the crack formation is intended to continue to the back side of the layer or material to be processed, the circular (annular) illumination still has the advantage that: (1) the laser power is used optimally in the sense that most of the laser light remains concentrated in the required length of the focal line, and (2) it is possible to achieve a uniform spot size along the focal line—and thus a uniform separation process along the damage tracks produced by the focal lines—due to the circularly illuminated zone in conjunction with the desired aberration set by means of the other optical functions.

Instead of the plano-convex lens depicted in FIG. 4A, it is also possible to use a focusing meniscus lens or another higher corrected focusing lens (asphere, multi-lens system).

In order to generate very short focal lines 2b using the combination of an axicon and a lens depicted in FIG. 4A, a very small beam diameter of the laser beam incident on the axicon may be needed. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances.

Figure 5:
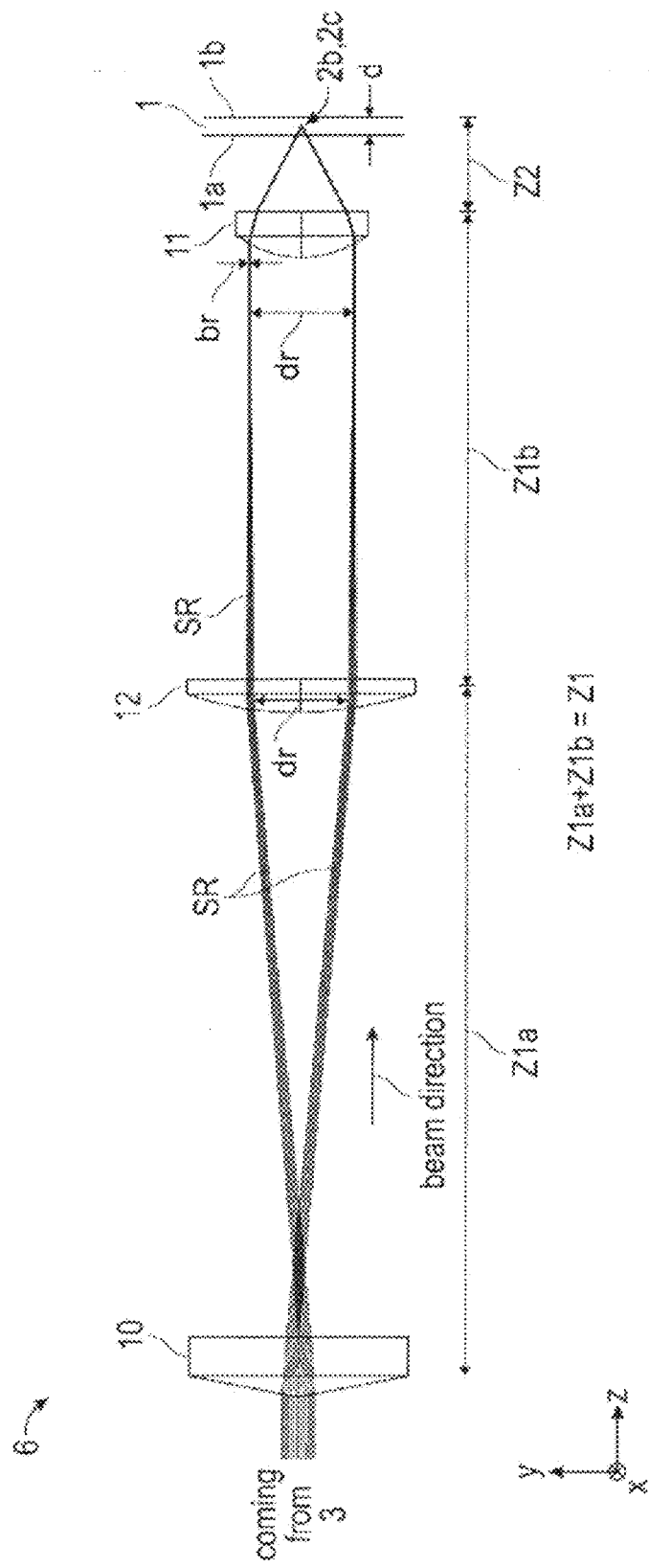
FIG. 5 is a schematic illustration of a fourth optical assembly for laser processing.

As shown in FIG. 5, both effects can be avoided by including another lens, a collimating lens 12 in the optical assembly 6. The additional collimating lens 12 serves to adjust the circular illumination of focusing lens 11 very tightly. The focal length f' of collimating lens 12 is selected in such a way that the desired circle diameter dr results from distance z1a from the axicon to the collimating lens 12, which is equal to f'. The desired width br of the ring can be adjusted via the distance z1b (collimating lens 12 to focusing lens 11). As a matter of pure geometry, the small width of the circular illumination leads to a short focal line. A minimum can be achieved at distance f'.

The optical assembly 6 depicted in FIG. 5 is thus based on the one depicted in FIG. 4A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the focal line 2b from the focusing lens 11 as z2 (always viewed in beam direction). As shown in FIG. 5, the circular radiation SR formed by axicon 10, which is incident divergently and under the circle diameter dr on the collimating lens 12, is adjusted to the required circle width br along the distance z1b for an at least approximately constant circle diameter dr at the focusing lens 11. In the case shown, a very short focal line 2b is intended to be generated so that the circle width br of approximately 4 mm at collimating lens 12 is reduced to approximately 0.5 mm at lens 11 due to the focusing properties of collimating lens 12 (circle diameter dr is 22 mm in the example).

In the depicted example, it is possible to achieve a length of the focal line 1 of less than 0.5 mm using a typical laser beam diameter of 2 mm, a focusing lens 11 with a focal length f=25 mm, a collimating lens with a focal length f'=150 mm, and choosing distances Z1a=Z1b=140 mm and Z2=15 mm.

Figure 6A:
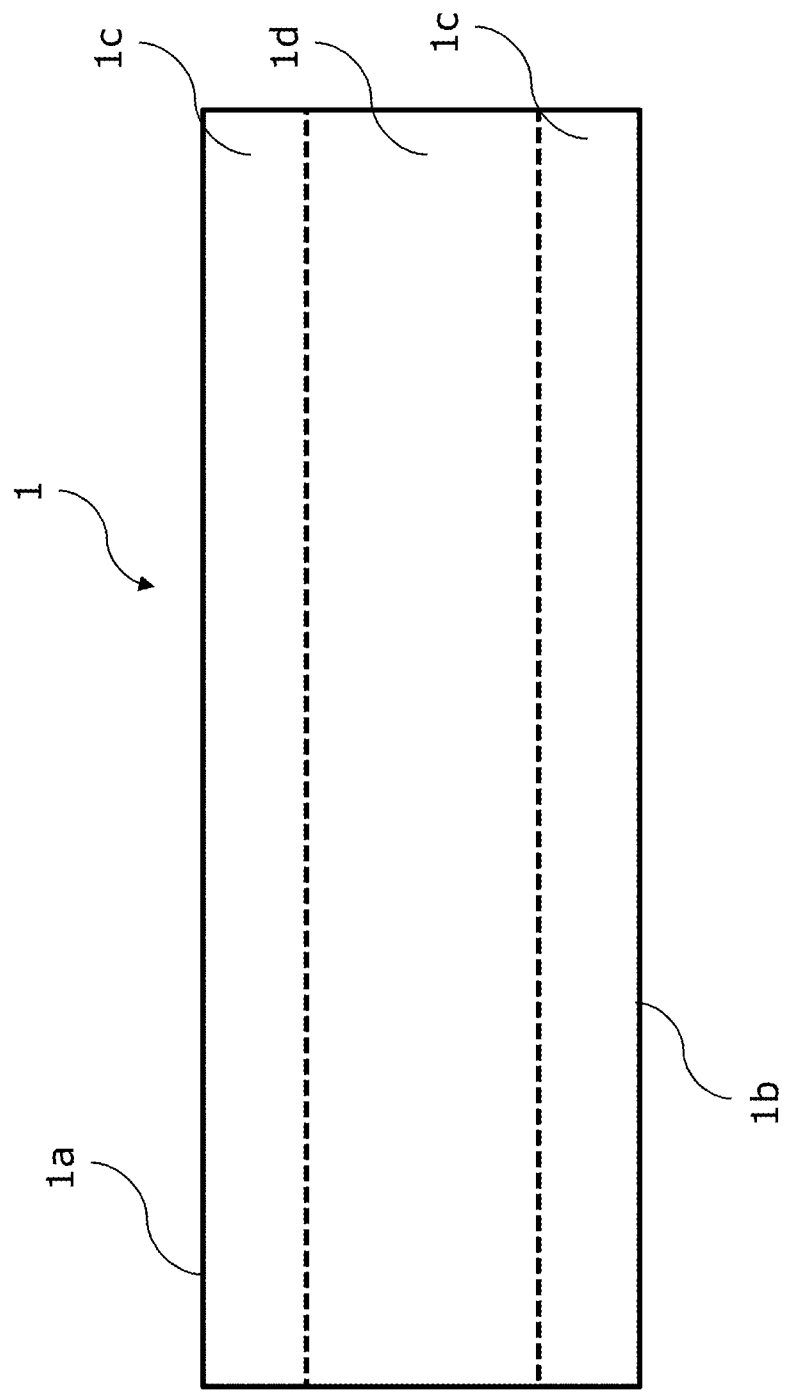
FIGS. 6A and 6B are schematic illustrations of a thermally tempered substrate having two compressive regions and an inner tension region according to one or more embodiments described and illustrated herein.
Figure 6B:
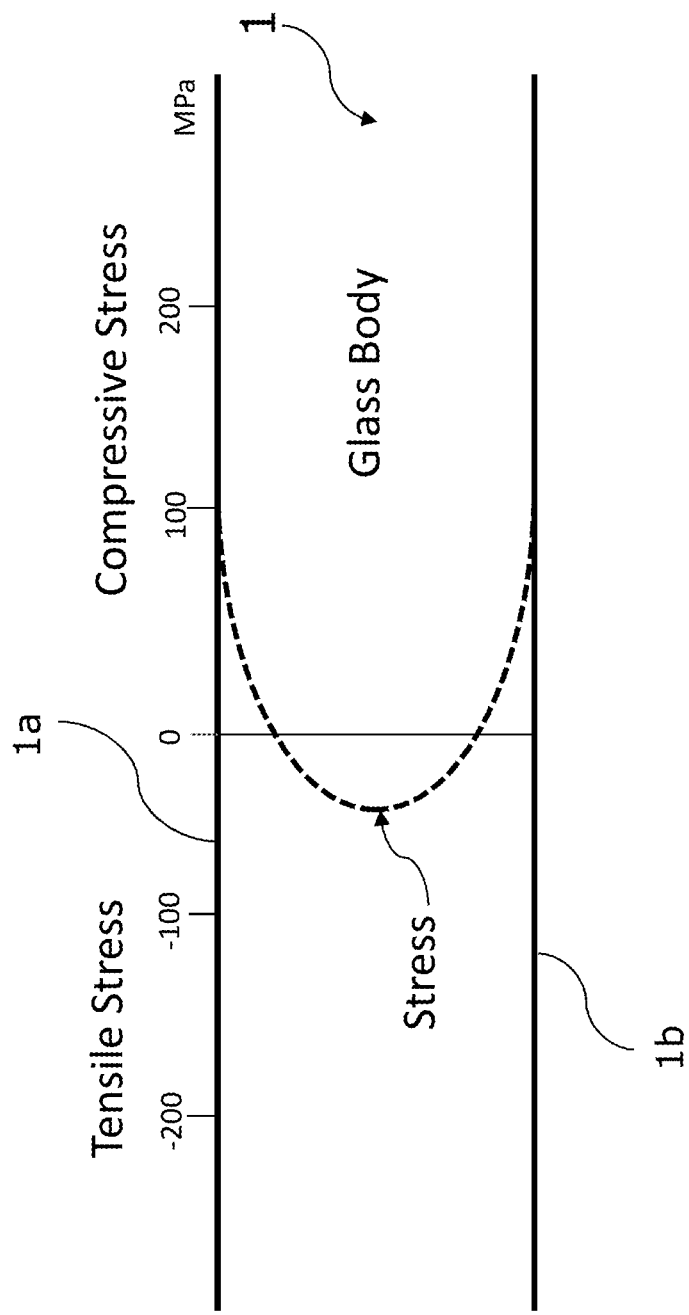

Laser processing methods for cutting thermally tempered substrates will now be described. Referring to FIG. 6A, a thermally tempered substrate 1, such as a thermally tempered glass substrate, is schematically illustrated. The thermally tempered substrate 1 includes a first surface 1a and a second surface 1b. Extending from the first and second surfaces 1a, 1b toward an interior of the thermally tempered substrate 1 are compressive regions 1c under compressive stress. An inner tension region 1d under tension is disposed between the compressive regions 1c and balances the compressive stress of the compressive regions 1c. The depth of the compressive regions (i.e., depth of layer ("DOL") depends on the tempering process. As an example and not a limitation, for thermally tempered glass, the DOL may be greater than 100 µm. FIG. 6B shows a typical stress profile of a thermally tempered glass substrate. The exact level of internal stress and specific functional dependence will depend on the exact thermally tempering conditions and the thickness of the glass substrate, but in general the functional dependence of the stress will take a parabolic shape, with the highest magnitude of compressive stress near the glass surfaces, and the highest magnitude of the tensile stress being near the center of the glass substrate. At a certain depth from each of the glass surfaces, the stress crosses over from being compressive to tensile, and these crossover points define the boundaries of the compressive and tensile regions show in FIG. 6A.

It is noted that other laser processes typically cut the substrate by introducing local damage either near the surface of the glass or at a specific location deep within the glass. Mechanical cutting processes cut by inducing a vent or crack at the topmost surface of the glass. In such cases, it may be challenging to make a damage zone that fully penetrates the thick compressive stress layer (greater than about 100 µm) that can be present in thermally tempered glass. This means it may be difficult to initiate a crack in a controlled manner in thermally tempered glass using either mechanical or past known laser methods. In contrast, the laser methods described herein are able to rapidly form damage tracks that can extend much further in the dimension perpendicular to the glass surface (multiple millimeters), and even can be made to extend all the way through the glass thickness. This allows greater control of the fracture plane orientation than is available with other laser methods.

To cut thermally tempered glass, the wavelength of the pulsed laser beam should be transparent to the material. As an example and not a limitation, the wavelength may be 1064 nm laser. The pulse duration and intensity should be short enough to achieve the multi-photon absorption effect described above. Ultra-short pulse lasers may be utilized, such as picosecond or femtosecond laser sources. In some embodiments, a ~10 picosecond pulsed laser may be utilized. As an example and not a limitation, with a line focus of between about 1 mm and about 3 mm extent, and a ~10 picosecond pulsed laser that produces output power of greater than about 50 W at a repetition rate of 200 kHz (250 uJ/pulse), then the optical intensities in the line region can easily be high enough to create non-linear absorption in the thermally tempered glass substrate.

Figure 7A:
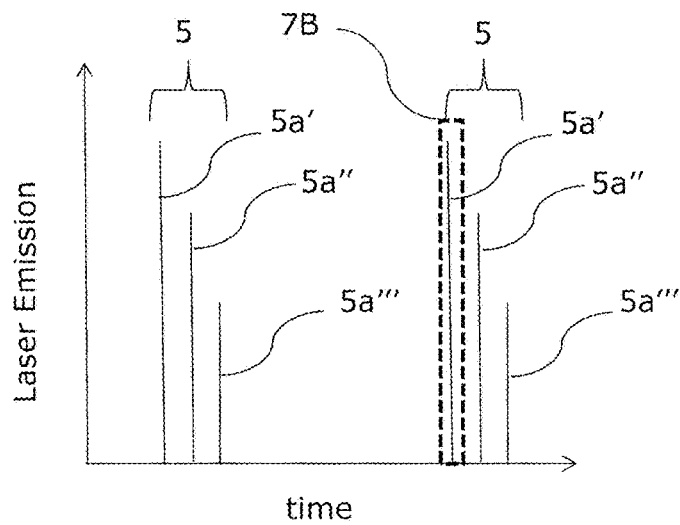
FIG. 7A-7C are a graphs of example laser emission as a function of time for a picosecond laser according to one or more embodiments described and illustrated herein.
Figure 7B:
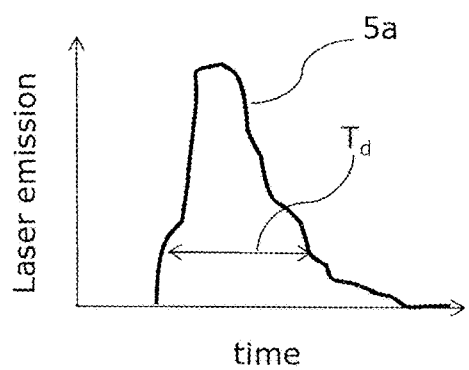

Note that the operation of such a picosecond laser described herein creates a "pulse burst" 5 sub-pulses 5a. FIG. 7A depicts two successive pulse bursts 5, each comprising three sub-pulses 5a, 5a', and 5a" (collectively "5a"). Producing pulse bursts is a type of laser operation where the emission of pulses is not in a uniform and steady stream but rather in tight clusters of sub-pulses. Each pulse burst contains multiple individual sub-pulses 5a (such as at least 2 sub-pulses, at least 3 sub-pulses, at least 4 sub-pulses, at least 5 sub-pulses, at least 10 sub-pulses, at least 15 sub-pulses, at least 20 sub-pulses, or more) of very short duration. That is, a pulse bust 5 is a "pocket" of sub-pulses 5a, and the pulse bursts 5 are separated from one another by a longer duration than the separation of individual adjacent pulses within each burst. Referring to FIG. 7B, which plots laser emission against time for sub-pulse 5a of FIG. 7A, sub-pulses have may have a pulse duration $T_d$ of up to 100 psec (for example, 0.1 psec, 5 psec, 10 psec, 15 psec, 18 psec, 20 psec, 22 psec, 25 psec, 30 psec, 50 psec, 75 psec, or therebetween). These individual sub-pulses (e.g., sub-pulses 5a, 5a', and 5a") within a single pulse burst 5 are referred to as sub-pulses herein to denote the fact that they occur within a single pulse burst. The energy or intensity of each individual sub-pulse 5a. 5a', 5a" within the pulse burst 5 may not be equal to that of other sub-pulses within the pulse burst, and the intensity distribution of the multiple sub-pulses within a pulse burst often follows an exponential decay in time governed by the laser design.

Figure 7C:
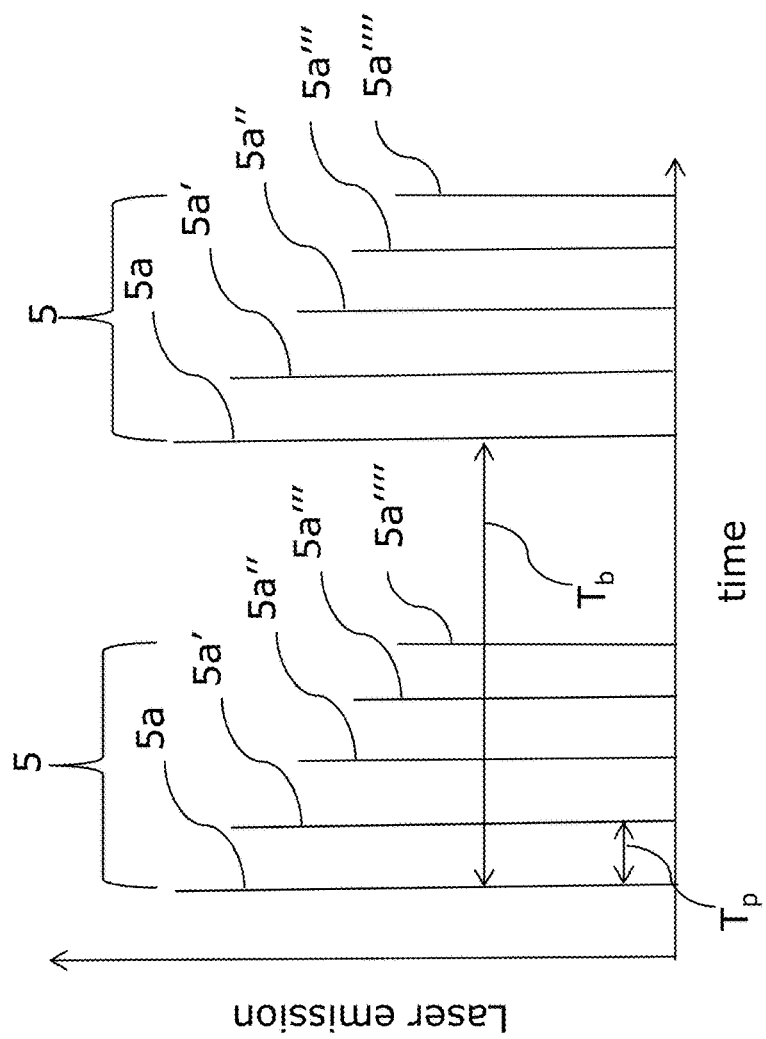

Referring to FIG. 7C, preferably, each sub-pulse (e.g., sub-pulses 5a, 5a', 5a") within the pulse burst 5 of the exemplary embodiments described herein are separated in time from the subsequent sub-pulse in the burst by a duration $T_p$ from 1 nsec to 50 nsec (e.g. 10-50 nsec, or 10-30 nsec, with the time often governed by the laser cavity design). For a given laser, the time separation $T_p$ between each sub-pulses (sub-pulse-to-sub-pulse separation) within a pulse burst 5 is relatively uniform (±10%). For example, in some embodiments, each sub-pulse within a pulse burst may be separated in time from the subsequent sub-pulse by approximately 20 nsec (50 MHz). For example, for a laser that produces a sub-pulse separation $T_p$ of about 20 nsec, the sub-pulse-to-sub-pulse separation $T_p$ within a pulse burst is maintained within about ±10%, or is about ±2 nsec. The time between each pulse burst 5 of sub-pulses 5a (i.e., time separation $T_b$ between pulse bursts) will be much longer (e.g., 0.25 μsec≤$T_b$≤1000 μsec, for example 1-10 μsec, or 3-8 μsec). In some of the exemplary embodiments of the laser described herein, the time separation $T_b$ is around 5 μsec for a laser with burst repetition rate or frequency of about 200 kHz. The laser burst repetition rate (also referred to as burst repetition frequency herein) is defined as the time between the first sub-pulse 5a in a pulse burst 5 to the first sub-pulse 5a in the subsequent pulse burst 5. In some embodiments, the burst repetition frequency may be in a range of between about 1 kHz and about 4 MHz. More preferably, the laser burst repetition rates can be, for example, in a range of between about 10 kHz and 650 kHz. The time $T_b$ between the first sub-pulse in each pulse burst to the first pulse in the subsequent pulse burst may be 0.25 μsec (4 MHz burst repetition rate) to 1000 μsec (1 kHz burst repetition rate), for example 0.5 μsec (2 MHz burst repetition rate) to 40 μsec (25 kHz burst repetition rate), or 2 μsec (500 kHz burst repetition rate) to 20 μsec (50 k Hz burst repetition rate). The exact timings, pulse durations, and burst repetition rates can vary depending on the laser design, but short sub-pulses ($T_d$<20 psec and preferably $T_d$≤15 psec) of high intensity have been shown to work particularly well.

The use of a laser capable of generating such pulse bursts is advantageous for cutting or modifying transparent materials, for example glass. In contrast with the use of single pulses spaced apart in time by the repetition rate of the single-pulse laser, the use of a pulse burst sequence that spreads the laser energy over a rapid sequence of sub-pulses within the burst 5 allows access to larger timescales of high intensity interaction with the material than is possible with single-pulse lasers. While a single pulse can be expanded in time, as this occurs the intensity within the pulse must drop as roughly one over the pulse width. Hence, if a 10 psec single pulse is expanded to a 10 nsec pulse, the intensity drop by roughly three orders of magnitude. Such a reduction can reduce the optical intensity to the point where non-linear absorption is no longer significant, and light material interaction is no longer strong enough to allow for cutting.

In contrast, with a pulse burst laser, the intensity during each sub-pulse 5a within the pulse burst 5 can remain very high—for example three 10 psec sub-pulses 5a spaced apart in time by approximately 10 nsec still allows the intensity within each sub-pulse to be approximately only three times lower than that of a single 10 psec pulse, while the laser is able to interact with the material over a timescale that is now three orders of magnitude larger. This adjustment of multiple sub-pulses 5a within a pulse burst thus allows manipulation of time-scale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of microcracks. The required amount of burst energy to modify the material will depend on the substrate material composition and the length of the line focus used to interact with the substrate. The longer the interaction region, the more the energy is spread out, and higher burst energy will be required. The exact timings, sub-pulse durations, and burst repetition rates can vary depending on the laser design, but short sub-pulses (<15 psec, or ≤10 psec) of high intensity have been shown to work well with this technique.

The defect line or a hole is formed in the material when a single pulse burst 5 of sub-pulses 5a strikes essentially the same location on the glass substrate. That is, multiple sub-pulses 5a within a single pulse burst 5 correspond to a single defect line or a hole location in the glass. Because the glass substrate is translated (for example by a constantly moving stage, or the beam is moved relative to the glass), the individual sub-pulses 5a within the pulse burst 5 cannot be at exactly the same spatial location on the glass substrate. However, they are well within 1 μm of one another, i.e., they strike the glass substrate at essentially the same location. For example, the sub-pulses 5a may strike the glass substrate at a spacing sp, where 0<sp≤1000 nm from one another. For example, when a location of the glass substrate is hit with a pulse burst 5 of 20 sub-pulses, the individual sub-pulses 5a within the pulse burst 5 strike the glass within 250 nm of each other. Thus, in some embodiments, 1 nm<sp<250 nm. In some embodiments, 1 nm<sp<100 nm.

As described above, the pulse burst produced by the pulsed laser is used to rapidly deposit energy along a defined line extending through the thermally tempered substrate, creating a damage track that typically extends approximately 1 mm to 3 mm through the bulk of the thermally tempered substrate. The length of the damage track depends on the focal length of the optics used.

Figure 8:
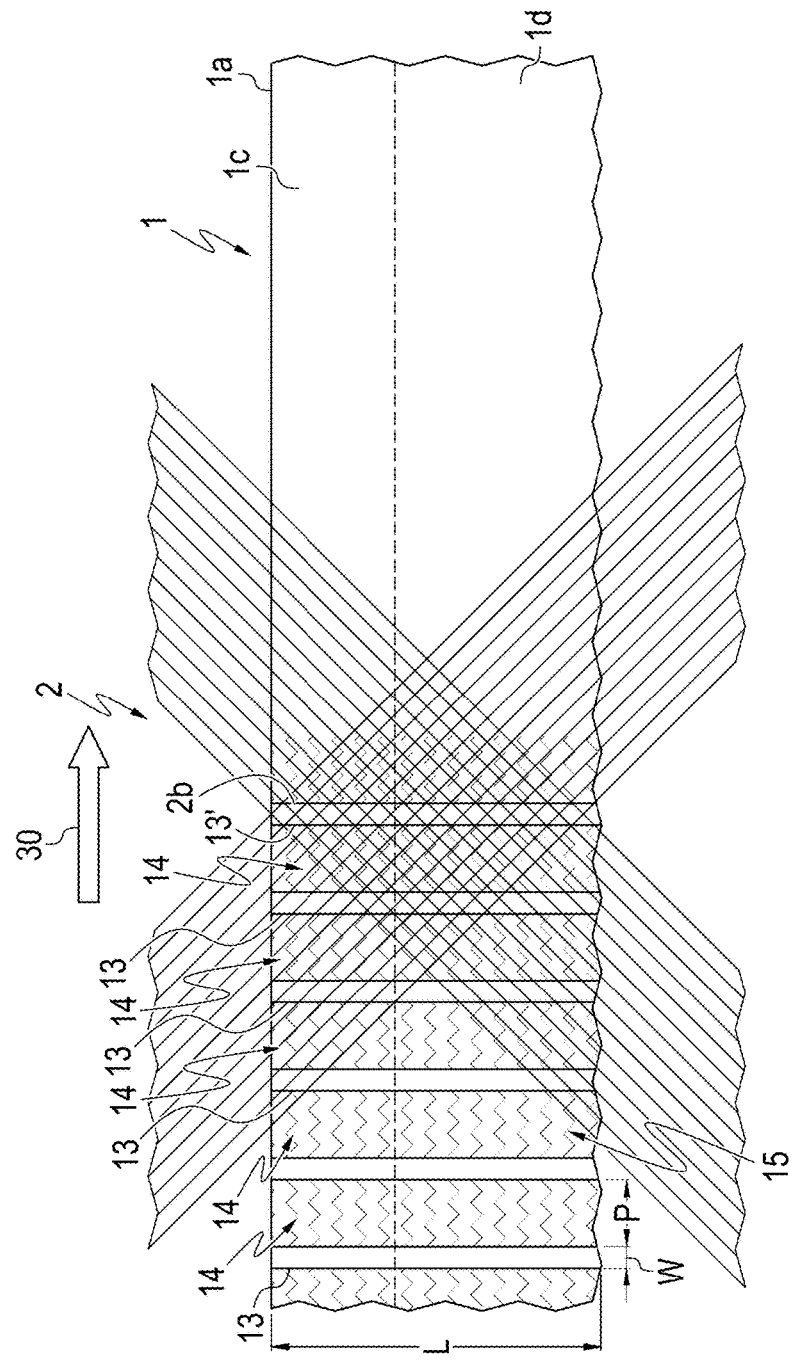
FIG. 8 schematically depicts a laser process to form a sequence of damage tracks within a thermally tempered substrate according to one or more embodiments described and illustrated herein.

Referring now to FIG. 8, a thermally tempered substrate 1 having a sequence of damage tracks 13 formed by a laser process is schematically illustrated. The damage tracks 13 generally take the form of holes with open interior dimensions (i.e., width w) of about 0.1 μm to about 1.5 μm. The holes may or may not be continuous in opening throughout the length of the damage track, as they may be blocked or closed in regions. Additionally, the modified glass or cracked region around each damage track 13 can be significantly larger, ranging from a few microns to many tens of microns, the extent of which can depend on the exact dimension of the line focus, the amount of burst energy used to form each damage track 13, and the exact laser conditions such as the number of sub-pulses per pulse burst. Thus, it is possible to create a microscopic (i.e., <2 μm and >100 nm in diameter in some embodiments, and <0.5 μm and >100 nm in some embodiments) elongated "hole" (also referred to herein as a perforation or a defect line) in transparent material using a single high energy pulse burst. These individual perforations may be created at rates of several hundred kilohertz (several hundred thousand perforations per second, for example). Thus, with relative motion between the source and the material, these perforations or damage tracks 13 may be placed at any desired location within the substrate. In some embodiments, the damage track 13 is a "through hole," which is a hole or an open channel that extends from the top to the bottom of the transparent material. In some embodiments, the damage track 13 may not be a continuous channel, and may be blocked or partially blocked by portions or sections of solid material (e.g., glass). As defined herein, the internal diameter of the damage track 13 is the internal diameter of the open channel or the air hole (or void). For example, in the embodiments described herein, the internal diameter of the damage track 13 is <500 nm, for example ≤400 nm, or ≤300 nm. The disrupted or modified area (e.g., compacted, melted, or otherwise changed) of the material surrounding the holes in the embodiments disclosed herein preferably has diameter of <50 μm (e.g., <10 μm).

In the illustrated example, the laser beam focal line 2b created by the pulsed laser beam 2 is positioned within the thermally tempered substrate 1 extending from the first surface 1a. The damage tracks 13 have a length L within the bulk of the thermally tempered substrate 1. At least a portion of each damage track 13 is within the inner tension region 1d of the thermally tempered substrate 1. As stated above, each damage track 13 may be created by a burst of sub-pulses, or it may be fully formed by a single pulse. Additional pulses do not make the damage track 13 extend deeper through the material; however they may alter the exact dimensions of the damage track 13 or the extent of the modified material around it.

The lateral spacing (i.e., pitch p) between each damage track is determined by the pulse rate of the laser as the thermally tempered substrate 1 is translated underneath the focused laser beam (or, alternatively, as the focused laser beam is translated with respect to the thermally tempered substrate). To produce damage tracks 13 at different pitches, the laser may be triggered to emit optical radiation at longer or shorter intervals. The selection of the pitch between damage tracks 13 may be governed by the hardness of the thermally tempered substrate 1 (i.e., its tendency to produce microcracks) and the stress level in the thermally tempered substrate 1 that helps the microcracks propagate. In general, thermally tempered substrates with higher levels of stress are cut with wider spacing between the damage tracks, and thermally tempered substrates with lower levels of stress are cut with damage tracks having closer spacing therebetween. As a non-limiting example, the lateral spacing may be between 2 μm and 20 μm.

Formation of each damage track 13 within the bulk of the thermally tempered substrate 1 causes one or more microcracks 14 to extend from the damage track 13 due at least in part to the internal stresses of the thermally tempered substrate 1. It should be understood that the microcracks 14 are shown schematically in FIG. 8, and that they may take on shapes and/or directions other than those depicted in FIG. 8. Further, in some cases, only one crack or microcrack may extend from a damage track 13.

As shown in FIG. 8, the microcracks extend between adjacent damage tracks 13. Without being bound by theory, it is believed that the small lateral extent of the damage (i.e., the microcrack(s) 14 extending from a damage track 13 in a direction generally parallel with the first or second surface 1a, 1b), with the long depth dimension L of the damage track 13, enable this laser method to cut thermally tempered glass substrates. By keeping the damage small laterally, the cracks or microcracks 14 do not grow too rapidly or become too large before the next damage track is made. Further, by making the damage track relatively long (i.e., longer than the microcracks 14), the process assures that the inner tension region 1d of the thermally tempered glass substrate 1, which is buried very far from the first and second surfaces 1a, 1b in the case of thermally tempered glass, can be reached. If damage does not extend to the inner tension region 1d, then cracks will not grow, or more importantly they will not grow in a time controlled manner.

FIG. 8 schematically depicts a thermally tempered substrate 1 having only been partially laser processed by the methods disclosed herein. Several damage tracks 13 have been created, with microcracks 14 extending therefrom. The illustrated focal line 2b will form another damage track 13' into the bulk of the thermally tempered substrate 1. As the damage track 13' is formed 13 (and/or just after it is formed), microcracks 14' begin to propagate therefrom. The relative speed of the laser beam 2 with respect to the thermally tempered substrate 1 is such that the laser beam focal line 2b is advanced with respect to the thermally tempered substrate 1 in the direction indicated by arrow 30 such that the microcracks 14' will be guided toward the next, not-yet-formed damage track within the series of damage tracks. In this manner, the microcracks are guided along the damage line 15 formed by the damage tracks 13 and the thermally tempered substrate 1 is successfully cut along this damage line 15.

Without being bound by theory, the methods described herein may be able to cut thermally tempered substrates because of the ability to quickly and clearly define a large damage plane or contour throughout most or all of the thickness of the body of the thermally tempered substrate before a strong enough internal damage event occurs that causes micro-cracks to propagate. This now-defined damage plane or contour then guides any subsequent cracking, allowing the material to separate along the pre-defined contour, rather than travelling in an uncontrolled manner which will cause the glass sheet to fragment into a multitude of pieces. Other methods (other laser and mechanical score methods) are not able to fully establish this damage plane or contour before the high internal stress in such a thermally tempered substrates is released in response to the damage the cutting processes introduces, meaning that the subsequent cracking is uncontrolled.

Use of a line focus to establish the internal damage allows one to define a very long region (e.g., about 1 mm or longer) with regard to the thickness of the thermally tempered substrate in a single pass, in contrast to conventional laser methods which only create damage over much shorter regions. Additionally, the use of a line focus spreads the laser energy out over along a linear region with no particular location in that linear region having much higher (e.g. >2-3×) energy density than any other.

In contrast, focusing a Gaussian beam inside a substrate will create small regions of damage, often only tens of microns, or possibly a hundred microns, in extent. Thus, this does not define a full "wall" of damage in a thermally tempered substrate that is many millimeters thick unless many, many passes (many tens of passes) are performed. Further, by its very nature, a Gaussian beam focus is far more intense in a small local region along the optical axis (the focus) of beam propagation than a few Rayleigh ranges away from that focus point. Thus, if the Gaussian beam is made intense enough to define a damage track over tens of microns or more, at the focus spot itself it is quite easy to create damage strong enough that it will initiate the uncontrolled cracking in sheet. This makes any process window that allows definition of a damage plane without initiating uncontrolled cracking extremely narrow (or nonexistent).

In the case of chemically strengthened glasses, a similar set of concepts applies. It is preferable to use a method such as a line focus to fully define a damage plane or contour within the glass substrate (ideally through the full depth of the glass substrate) before the micro-cracks propagate. However, such chemically strengthened glasses often do not have the same levels of internal forces present in them as thermally tempered glasses, so chemically tempered glasses may be more forgiving. If the damage plane is not fully formed, the subsequent cracking still may be controlled well enough to yield parts around the desired contours, and, in addition, upon initiation of damage to the tension layer such chemically strengthened sheets do not crack as quickly and have as rapid a crack propagation as the thermally tempered sheets. For lower central tension glasses (e.g. CT <20 MPa), the process windows are the widest and the most forgiving to not having fully formed damage planes or contours, whereas for higher central tension sheets (e.g. CT >20 MPa, especially CT >50 MPa), the process windows are narrower and require more rapid and complete formation of the pre-defined damage planes and contours. Finally, the thickness of chemically strengthened glass sheets is typically much less (generally <2.5 mm) than that of thermally tempered glass sheets (typically >3 mm). This means that defining a damage plane or contour throughout a substantial portion of the thickness of the glass sheet is more challenging for thermally tempered sheets, making use of a line focus of >1 mm in extent particularly advantageous as compared to using other laser methods.

The laser power and lens focal length (which determines the line focus length and hence power density) should be chosen to ensure full penetration of the glass and low micro-cracking. The laser power may be between about 25 W and about 60 W, for example. Attempts to cut the glass with higher power densities that could be induced by using too short a focal length lens (for example 30 mm or 40 mm) (which generates extremely high power densities in the lines focus), too high a burst energy or too dense a pitch between the damage tracks may result in fragmentation of the thermally tempered glass substrate. As a non-limiting example, for thermally tempered glass substrates, it has been found that a line focus length of about 1-3 mm, a laser burst energy of 150-750 µJ/burst, a damage track lateral spacing of 2-15 µm, and a number of sub-pulses per burst of 2-15, are acceptable ranges. More preferably, burst pulse energies of 150-250 µJ may be used, and sub-pulses/burst of 3-6 may be used, along with damage track lateral spacing of 5-10 µm.

For thinner thermally tempered substrates (e.g., less than 2.5 mm) where the line focus passes completely though the bulk of the substrate, only a single pass of the pulsed laser beam may be needed. However, for thicker thermally tempered substrates, a multiple pass approach may be utilized, where the focus at each subsequent pass is raised to allow for complete cutting of the thermally tempered substrate after N passes. While it is possible to form damage tracks at a lower focus setting (i.e. further away from the focusing optics) than a set of previous formed damage tracks, it is generally preferred to make the lowest focus pass first, and then raise the focus on subsequent passes. This may help prevent previously formed damage tracks from interfering with the propagation of the laser beam.

FIG. 9 schematically depicts a thermally tempered substrate having three passes as depicted by laser pass lines A, B and C. For laser pass line A, the midpoint $M_A$ of the laser beam focal line 2b is within a first compressive region 1c. For laser pass line B, the midpoint $M_B$ of the laser beam focal line 2b is within the inner tension region 1d. For laser pass line C, the midpoint $M_C$ of the laser beam focal line 2b is within a second compressive stress region 1c'.

Figure 10A:
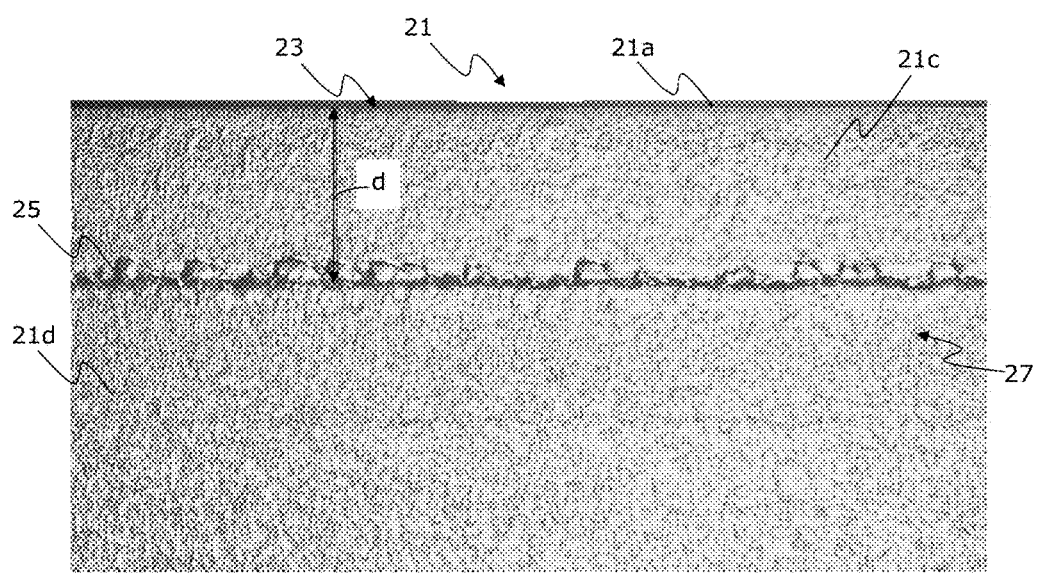
FIG. 10A is a microscope image of a side (cross-section) of a laser-cut edge of a thermally tempered glass substrate at a laser-entrance surface.
Figure 10B:
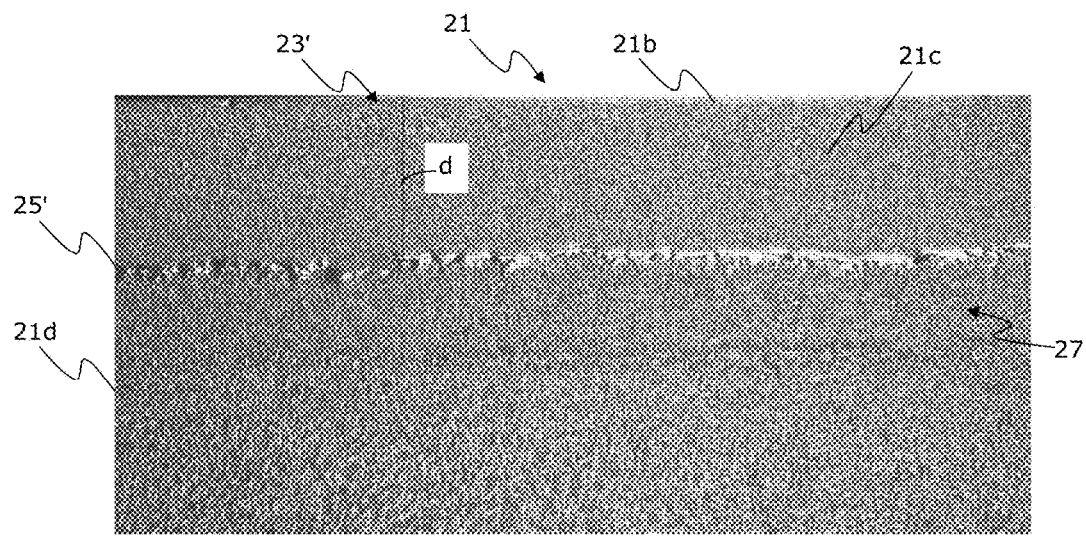
FIG. 10B is a microscope image of a side (cross-section) of a laser-cut edge at a laser-exit surface of the thermally tempered glass substrate depicted in FIG. 10A.

FIGS. 10A and 10B are microscope images of a laser-cut edge 27 of a thermally tempered soda-lime glass sheet 20 using the laser processes described herein. Two laser passes were used to cut the thermally tempered glass sheet of thickness 3.2 mm. FIG. 10A depicts a first surface 21a of the thermally tempered glass sheet 20 (i.e., the laser-entrance surface). Although difficult to see in the microscope image, the entrances of individual damage tracks 23 may be seen along the first surface 21a of the thermally tempered glass sheet. The damage tracks 23 extend into the bulk of the thermally tempered glass sheet 20 through the compressive region 21c and into the inner tension region 21d. At a depth of approximately 592 µm, a structural change 25 is seen in the laser-cut edge 27, which is likely correlated with the approximate depth of layer (depth of the inner tension region 21d) of this piece of thermally tempered glass.

FIG. 10B depicts a second surface 21b (i.e., the laser-exit surface). Although difficult to see in the microscope image, damage tracks 23 induced by the laser are present along the laser-cut edge 27 of the thermally tempered glass. Similar to FIG. 10A, a structural change 25' is present in the cut edge at a depth of approximately 546 µm, which likely is correlated with the depth of layer of this piece of thermally tempered glass.

Figure 11A:
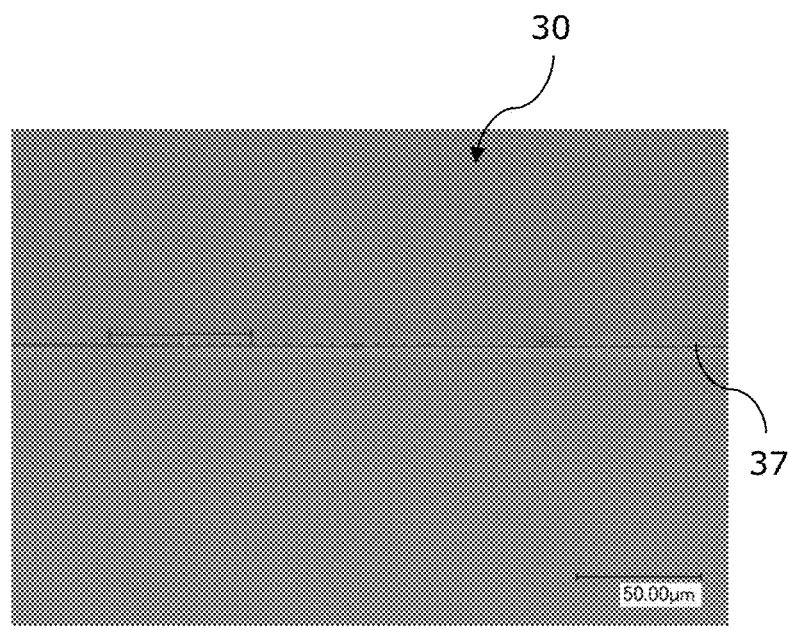
FIG. 11A is a microscope image of a top side of laser-cut edge of a thermally tempered glass substrate.

FIG. 11 shows a top view (a view from the top side of a piece of glass as opposed to a view from the cut edge side) of the cut edge 37 of a piece of thermally tempered glass 30. A periodic scalloping along the edge can be seen, with an approximate period of 6 microns. These features arise from the laser perforations or entrance holes that define the edge 37 along which the thermally tempered glass 30 has separated. The magnitude (depth perpendicular to the cut surface) of the scalloping is approximately 1 micron (e.g. <3 microns, or <2 microns, more frequently <1 micron).

Figure 12A:
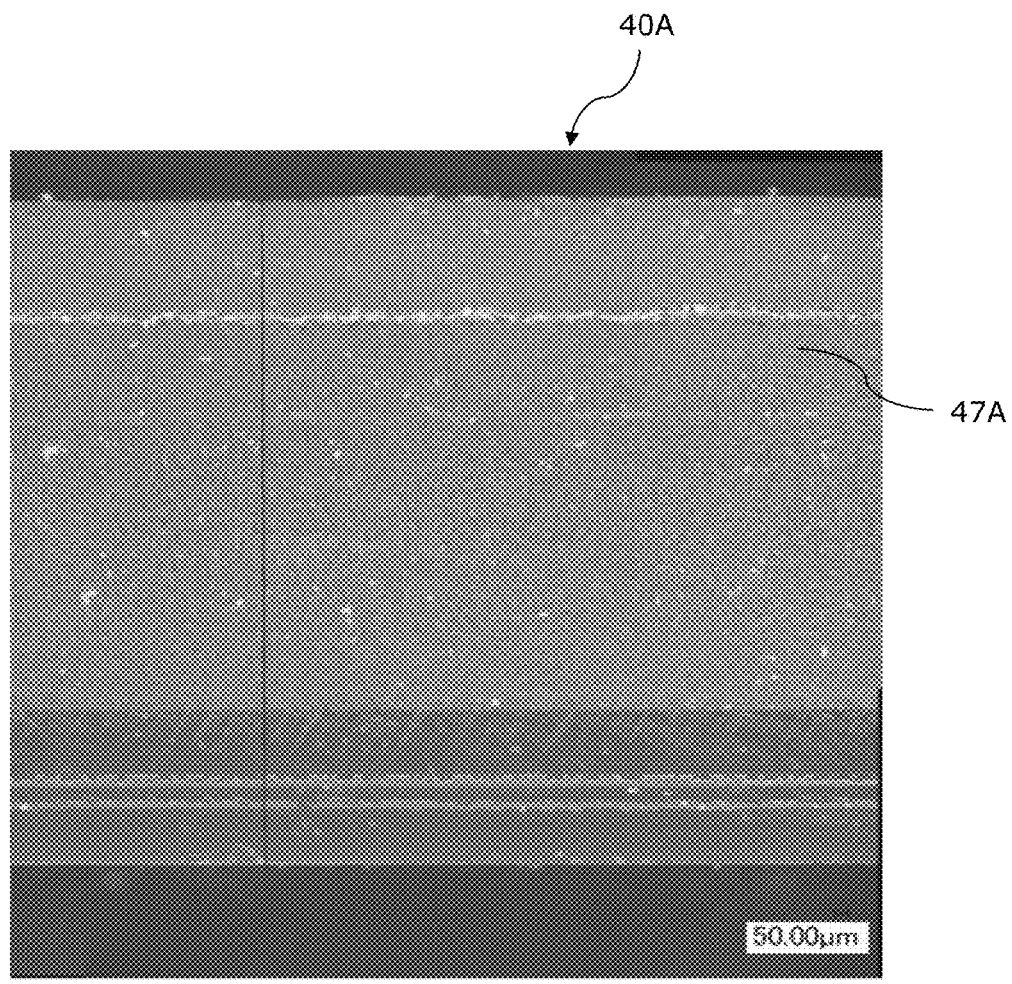
FIGS. 12A-12C are microscope images of sides (cross sections) of a laser cut edges for three pieces of 3.2 mm thick thermally tempered glass substrate.
Figure 12B:
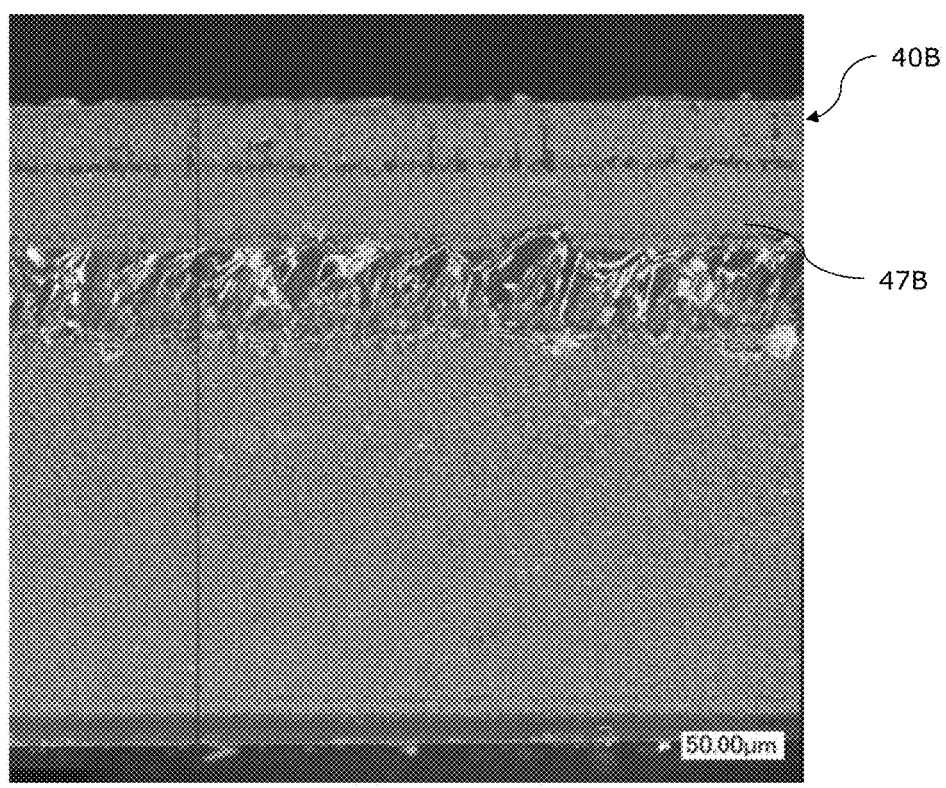
Figure 12C:
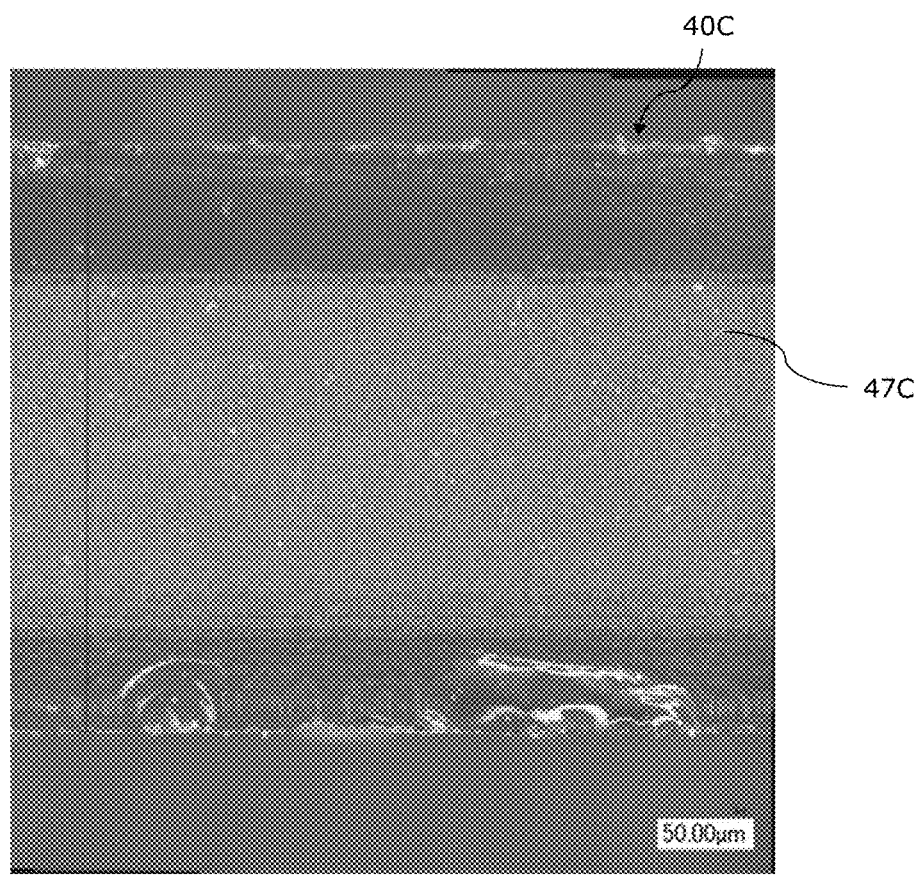

FIGS. 12A, 12B, and 12C show side views (cross sections) of the exposed laser-cut edges 47A, 47B, 47C of three pieces of approximately 3.2 mm thick thermally tempered glass sheets 40A, 40B, 40C where the glass sheets were cut without inducing catastrophic shattering (fragmentation). Between the three cases, the exact focus conditions were varied, leading to differing perforation (damage track) structures evident in the sides of each piece. In FIG. 12A, the damage tracks are seen in the upper 80% of the glass piece, but the bottom 20% exhibits only weak laser marks. In FIG. 12B, the damage tracks are present in the upper 90% of the glass piece, however there is a region approximately ⅓ of the distance from the top of the glass piece that is approximately 500 microns in depth that show where the fracture plane has not been precisely guided by the laser damage tracks. Nevertheless, the glass piece separated in a controlled manner as the majority of the depth of the glass piece had the fracture plane controlled. In FIG. 12C, the laser damage tracks are evident only in the center 60% of the glass edge (which is a region more dominated by tensile stress), but are not present in the upper and lower ~20% of the edges, which are the regions more dominated by compressive stress. However, in all of the above cases (FIG. 12A, 12B, 12C), enough of a fraction of the depth of the glass was laser-perforated (>50% in all three cases) that the fracture plane was well controlled, and the glass pieces separated along the contours defined by the laser, as opposed to causing uncontrolled cracks propagation and catastrophic fragmentation of the glass sheets.

Figure 13A:
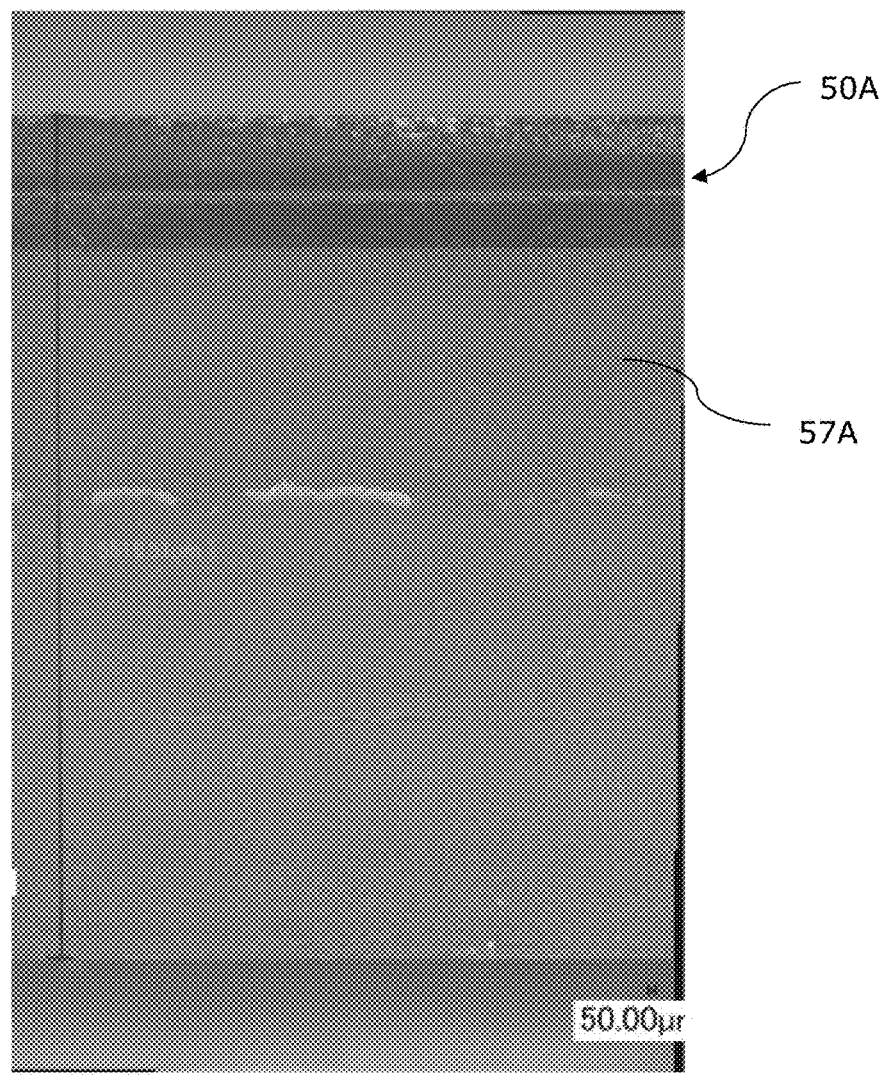
FIGS. 13A-13C are microscope images of the sides (cross sections) of a laser cut edges for three pieces of 5.5 mm thick thermally tempered glass substrate.
Figure 13B:
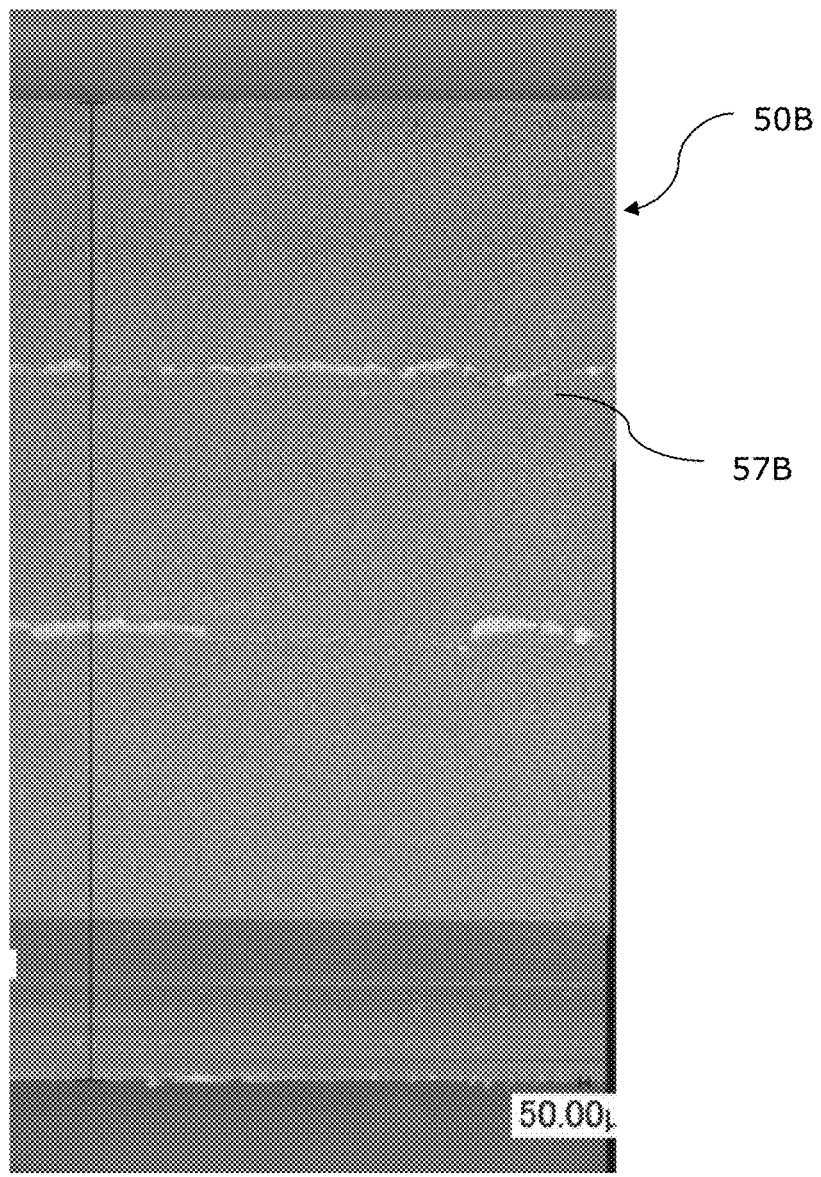
Figure 13C:
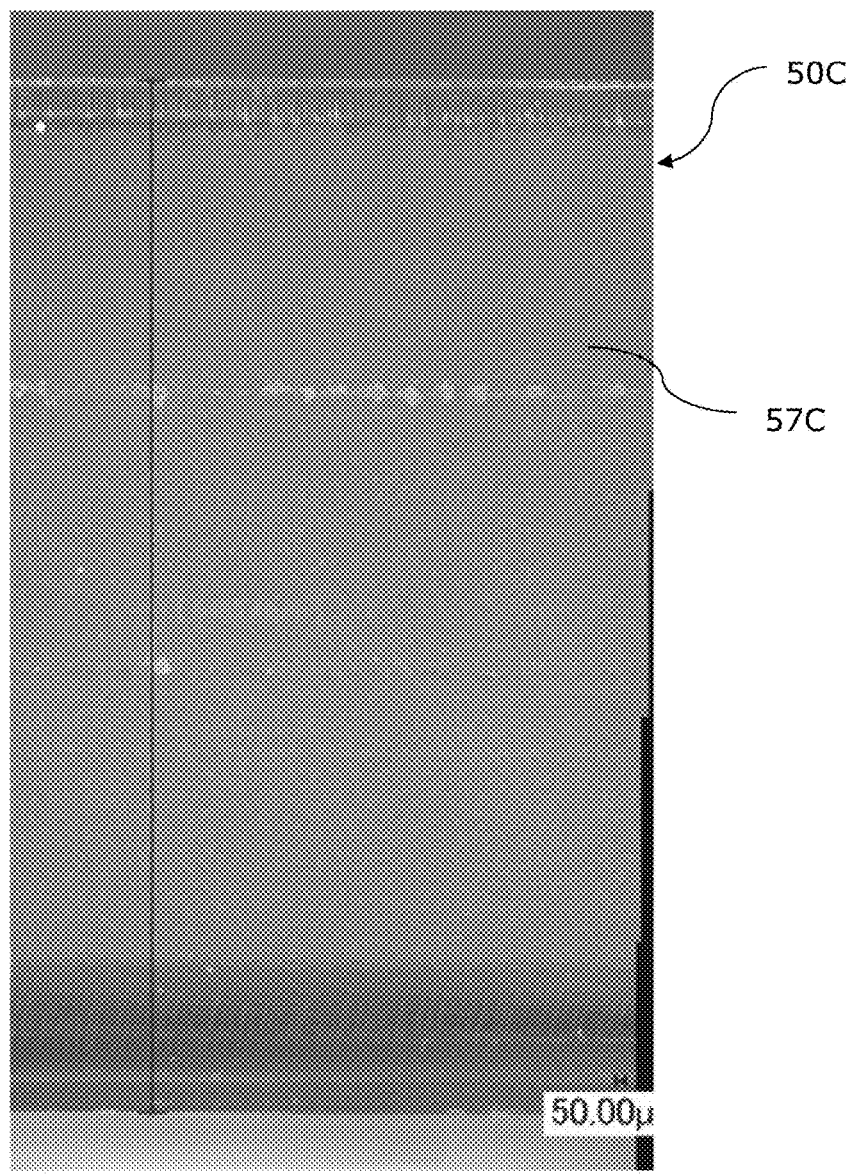

FIGS. 13A, 13B, and 13C show side views (cross sections) of the exposed laser-cut edges 57A, 57B, 57C of three pieces of approximately 5.5 mm thick thermally tempered glass sheets 50A, 50B, 50C where the glass sheets were cut without inducing catastrophic shattering (fragmentation). FIG. 13A shows the lower 80% of the depth of the glass sheet (about 4.5 mm) is covered by the laser damage tracks made by three laser passes. FIG. 13B has the upper 80% of the depth of the glass sheet covered by the damage tracks of three laser passes, and FIG. 13C has the middle of the glass sheet covered by the damage tracks, with the upper 5% not strongly perforated and the lower 15% not strongly perforated. The thin glass regions the extend horizontally across the images show the approximate regions where the laser damage tracks reach the end of their extent, showing that each pass is damaging of perforating a depth of approximately 1.5 mm. Note in all cases the >75% of the depth of the glass sheet is fully perforated, defining the glass fracture plane through the majority of the depth of the glass sheet. This allows all the 5.5 mm thermally tempered sheets to be successfully cut and separated without catastrophic fragmentation.

EXAMPLES

Fully thermally tempered soda-lime glass having a compressive stress at the glass surface greater than 69 MPa (10,000 psi) of varying thicknesses were cut using the laser processing methods described herein. The following conditions were found to be efficient for cutting the material without fragmentation:
  1064 nm picosecond laser having an output power of greater than about 30 W
  optical system parameters producing a line focus approximately 2 mm in length:
    input beam diameter to axicon lens ~3 mm 1/e^2 diameter;
    axicon angle=10 degrees;
    initial collimating lens focal length=125 mm; and
    final objective lens focal length=50 mm;
  5 sub-pulses per pulse burst, (the laser burst energy delivered to the glass was approximately 160 µJ); and
  pitch between adjacent damage tracks of about 7 µm, and
    the speed of the relative motion between the laser and the substrate of about 1 meter/sec. (The 7 µm pitch and speed of 1 m/sec means that new damage tracks were being created at a rate of 142 kHz, or one every 7 microsecond).

It should be understood that the above parameters are for illustrative purposes only, and that embodiments are not limited thereto. Other parameters are also possible, particularly for thermally tempered substrates other than fully thermally tempered soda-lime glass.

Example 1

For this Example, 3.2 mm thick fully thermally tempered soda lime glass sheets were cut using two laser passes at different focal heights within the glass sheet that created two damage lines of damage tracks. The laser and optical parameters were as provided above.

The focus of the first pass was set such that the line focus was centered at approximately the center of the glass sheet. The focus of the second pass was set with the optics physically 1.1 mm lower, which, accounting for the refractive index of the glass, would produce a line focus centered very close to the bottom of the glass. The glass did not separate until the second (lower) laser pass was completed. The focus settings that produced the best results are as follows:
  first laser pass: focus set at z=2.3 mm; and
  second laser pass: focus set at z=1.18 mm.

The fully thermally tempered glass sheet had enough stress (central tension) present within its bulk so that, after exposure with the above laser conditions, the glass substrate quickly separated along the path created by the damage line. As described above, it is important to keep the speed of the cut fast enough so that the microcracks emerging from the damage tracks do not "out run" the damage tracks. If the speed is set too low, the microcracks can become uncontrolled and do not follow the damage tracks, which leads to the glass eventually shattering.

Example 2

In the next Example, three laser passes were used to cut 5.5 mm thick thermally tempered soda lime glass sheets. The laser conditions were the same as provided in Example 1 except for the following:
  first laser pass: focus set at z=2.8 mm;
  second laser pass: focus set at z=3.7 mm;
  third pass: focus is set at z=5.0 mm; and
  laser pulse energy: approximately 190 µJ.

The laser process made damage lines at progressively higher locations within the glass sheet. The first pass made a damage line in the lower third of the glass sheet, the second at about 0.9 mm physically higher than the first damage line with the optics (or, accounting for the refractive index, about 1.4 mm higher within the glass sheet), and the last pass about 1.3 mm higher with the optics (about 1.95 mm higher within the glass sheet). The glass sheet was cut after completion of the third pass.

The laser processing methods described herein may be used to not only cut thermally tempered substrates along straight lines, but also along curved lines to cut arbitrarily shaped articles from a thermally tempered substrate sheet.

It should now be understood that embodiments described herein provide for the laser cutting of thermally tempered substrates without the need for local de-tempering around a desired cut line. Embodiments use an ultra-short pulsed laser and a specialized optical delivery system to create precise damage tracks within the thermally tempered substrate. These damage tracks guide the propagation of microcracks caused by the internal stresses within the thermally tempered substrate, which allow crack propagation to be precisely controlled, thereby preventing the thermally tempered substrate from shattering during the cutting process. The methods described herein allow for glass to be cut to the desired shape after the tempering process. Additionally, embodiments described herein cut thermally tempered substrates at a high speed (e.g., about 1 m/second in some embodiments), and can form complex shapes such as rectangles, chamfers, radius corners, and circles. Further, the processes described herein may be used with a variety of substrate thicknesses and levels of tempering.

While exemplary embodiments have been described herein, it will be understood by those skilled in the art that various changes in form and details may be made therein without departing from the scope encompassed by the appended claims.

The invention claimed is:

1. A method of separating a thermally tempered substrate, the method comprising:
   directing a laser beam focal line into the thermally tempered substrate such that at least a portion of the laser beam focal line is within a bulk of the thermally tempered substrate, wherein the laser beam focal line is formed by a pulsed laser beam, and the laser beam focal line is disposed along a beam propagation direction;
   pulsing the pulsed laser beam to form a sequence of pulse bursts comprising one or more sub-pulses, wherein the laser beam focal line generates an induced multiphoton absorption within the thermally tempered substrate that produces a damage track within the bulk of the thermally tempered substrate along the laser beam focal line; and
   providing relative motion between the pulsed laser beam and the thermally tempered substrate in a first laser beam pass such that the pulsed laser beam forms a first sequence of damage tracks within the thermally tempered substrate, wherein individual damage tracks of the first sequence of damage tracks are separated by a lateral spacing, and one or more microcracks connect adjacent damage tracks of the first sequence of damage tracks.

2. The method of claim 1, wherein the thermally tempered substrate is a thermally tempered glass substrate having greater than 24 MPa of compressive stress at a surface of the thermally tempered glass substrate.

3. The method of claim 2, wherein the laser beam focal line is positioned within the thermally tempered glass substrate such that the first sequence of damage tracks are disposed through at least 50% of a thickness of the thermally tempered glass substrate.

4. The method of claim 1, wherein each of the damage tracks of the first sequence of damage tracks have a diameter between about 0.5 µm and about 1.5 µm.

5. The method of claim 1, wherein the pulsed laser beam has a laser burst energy delivered to the thermally tempered substrate is between about 150 µJ and about 750 µJ, and each individual pulse burst has between one and twenty sub-pulses.

6. The method of claim 1, wherein a time between individual pulse bursts is such that the lateral spacing between where individual pulse bursts strike the thermally tempered substrate is greater than or equal to 2 µm and less than or equal to 20 µm.

7. The method of claim 1, wherein:
   the pulsed laser beam has laser power between about 25 W and about 60 W;
   each pulse bursts of the sequence of pulse bursts have between 2 and 25 sub-pulses; and
   the lateral spacing between damage tracks is between about 2 µm and about 10 µm.

8. The method of claim 1, wherein each pulse burst comprises a single sub-pulse.

9. The method of claim 1, wherein each pulse burst comprises a plurality of sub-pulses.

10. The method of claim 9, wherein a time between individual sub-pulses of an individual pulse burst is between about 10 and about 50 nanoseconds.

11. The method of claim 10, wherein a duration of an individual sub-pulse is between about 1 picosecond and about 100 picoseconds.

12. The method of claim 10, wherein a duration of an individual sub-pulse is between about 5 picoseconds and about 20 picoseconds.

13. The method of claim 1, wherein the laser beam focal line has a length between about 1 mm and about 10 mm.

14. The method of claim 1, wherein the laser beam focal line has a length between about 1 mm and about 5 mm.

15. The method of claim 1, further comprising:
   following the first laser beam pass, adjusting a position of the laser beam focal line such that a midpoint of the laser beam focal line is at a depth within the bulk of the thermally tempered substrate that is different from a depth of the midpoint of the laser beam focal line within the bulk of the thermally tempered substrate during the first laser beam pass; and
   providing relative motion between the pulsed laser beam and the thermally tempered substrate in a second laser beam pass such that the pulsed laser beam forms a second sequence of damage tracks within the bulk of the thermally tempered substrate, wherein individual damage tracks of the first sequence of damage tracks and the second sequence of damage tracks have a length of greater than 1 mm in length.

16. The method of claim 15, further comprising:
   following the second laser beam pass, adjusting the position of the laser beam focal line such that the midpoint of the laser beam focal line is positioned at a depth within the bulk of the thermally tempered substrate that is different from a depth of the midpoint of the laser beam focal line within the bulk of the thermally tempered substrate during the first laser beam pass and during the second laser beam pass; and
   providing relative motion between the pulsed laser beam and the thermally tempered substrate in a third laser beam pass such that the pulsed laser beam forms a third sequence of damage tracks within the bulk of the thermally tempered substrate, wherein 50% or more of a thickness of the thermally tempered substrate is exposed to damage tracks of the first, second and third sequence of damage tracks.

17. The method of claim 1, wherein the pulsed laser beam is focused by a focusing lens and the pulsed laser beam irradiates the focusing lens in the form of an annulus.

18. The method of claim 1, wherein the pulsed laser beam traverses an axicon.

19. The method of claim 1, wherein the one or more microcracks form within the thermally tempered substrate and connect adjacent damage tracks of the first sequence of damage tracks without applying additional stress to the first sequence of damage tracks.

20. The method of claim 1, wherein the laser beam focal line comprises a pattern of light rays having a linear shape, parallel to an optical axis of the pulsed laser beam.

* * * * *

UNITED STATES PATENT AND TRADEMARK OFFICE
CERTIFICATE OF CORRECTION

PATENT NO. : 10,252,931 B2
APPLICATION NO. : 14/993236
DATED : April 9, 2019
INVENTOR(S) : Moussa N'Gom et al.

Page 1 of 1

It is certified that error appears in the above-identified patent and that said Letters Patent is hereby corrected as shown below:

On the Title Page

On page 5, Column 2, item (56), other publications, Line 11, delete "Culling" and insert -- Cutting --, therefor.

On page 6, Column 1, item (56), other publications, Lines 10-11, delete "Eelectropolishing;" and insert -- Electropolishing; --, therefor.

On page 6, Column 2, item (56), other publications, Line 15, delete "pluse" and insert -- pulse --, therefor.

On page 6, Column 2, item (56), other publications, Line 56, delete "Glas" and insert -- Glass --, therefor.

On page 6, Column 2, item (56), other publications, Line 61, delete "Searchign Autority;" and insert -- Searching Authority; --, therefor.

Signed and Sealed this
Twenty-fifth Day of February, 2020

Andrei Iancu
*Director of the United States Patent and Trademark Office*